(12) United States Patent
Huang et al.

(10) Patent No.: US 11,953,655 B2
(45) Date of Patent: Apr. 9, 2024

(54) OPTICAL IMAGING SYSTEM

(71) Applicant: Zhejiang Sunny Optical Co., Ltd, Zhejiang Province (CN)

(72) Inventors: Lin Huang, Zhejiang Province (CN); Yunbing Ji, Zhejiang Province (CN)

(73) Assignee: ZHEJIANG SUNNY OPTICAL CO., LTD, Zhejiang (CN)

(*) Notice: Subject to any disclaimer, the term of this patent is extended or adjusted under 35 U.S.C. 154(b) by 775 days.

(21) Appl. No.: 17/021,420

(22) Filed: Sep. 15, 2020

(65) Prior Publication Data

US 2020/0409122 A1 Dec. 31, 2020

Related U.S. Application Data

(63) Continuation of application No. PCT/CN2019/099417, filed on Aug. 6, 2019.

(30) Foreign Application Priority Data

Nov. 28, 2018 (CN) .......................... 201811448647.5

(51) Int. Cl.
*G02B 9/64* (2006.01)
*G02B 13/00* (2006.01)
*G02B 27/00* (2006.01)

(52) U.S. Cl.
CPC .......... *G02B 13/0045* (2013.01); *G02B 9/64* (2013.01); *G02B 27/0025* (2013.01)

(58) Field of Classification Search
CPC .. G02B 13/0045; G02B 9/64; G02B 27/0025; G02B 13/18
See application file for complete search history.

(56) References Cited

U.S. PATENT DOCUMENTS 4,464,023 A * 8/1984 Kato .............. G02B 15/143103
359/740
4,621,909 A * 11/1986 Hamanishi ............... G02B 9/62
359/755

(Continued)

FOREIGN PATENT DOCUMENTS

CN 103529539 A 1/2014
CN 104597582 A 5/2015

(Continued)

OTHER PUBLICATIONS

International Search Report dated Aug. 22, 2019, in connection with PCT International Application No. PCT/CN2019/099417.

(Continued)

*Primary Examiner* — Balram T Parbadia
(74) *Attorney, Agent, or Firm* — Norris McLaughlin, P.A.

(57) ABSTRACT

The present disclosure discloses an optical imaging system including, sequentially from an object side to an image side along an optical axis, a first lens, a second lens, a third lens, a fourth lens, a fifth lens, a sixth lens and a seventh lens having reactive power. The first lens has positive refractive power, and the first lens is a glass lens; an object-side surface of the second lens is a convex surface, and an image-side surface of the second lens is a concave surface; and each of the fourth lens and the fifth lens has negative refractive power. An aperture value Fno of the optical imaging system satisfies Fno<1.4.

18 Claims, 12 Drawing Sheets

(56) References Cited

U.S. PATENT DOCUMENTS

| | | | |
|---|---|---|---|
| 4,702,568 A * | 10/1987 | Okudaira | G02B 9/62 359/755 |
| 10,197,773 B2 | 2/2019 | Tsai et al. | |
| 10,324,275 B2 | 6/2019 | Hsieh et al. | |
| 10,365,457 B2 | 7/2019 | Gong et al. | |
| 2009/0273851 A1 * | 11/2009 | Take | G02B 15/1461 359/755 |
| 2014/0009843 A1 | 1/2014 | Tsai et al. | |
| 2014/0253782 A1 | 9/2014 | Tsai et al. | |
| 2017/0184822 A1 | 6/2017 | Shi | |
| 2017/0329108 A1 * | 11/2017 | Hashimoto | G02B 9/64 |
| 2017/0357081 A1 | 12/2017 | Dai et al. | |
| 2018/0188483 A1 | 7/2018 | Hsieh et al. | |
| 2018/0188486 A1 | 7/2018 | Gong et al. | |
| 2019/0121100 A1 | 4/2019 | Song et al. | |

FOREIGN PATENT DOCUMENTS

| | | |
|---|---|---|
| CN | 106908931 A | 6/2017 |
| CN | 107367827 A | 11/2017 |
| CN | 107577034 A | 1/2018 |
| CN | 109239894 A | 1/2019 |
| CN | 209215717 U | 8/2019 |
| IN | 106896476 A | 6/2017 |

OTHER PUBLICATIONS

English translation of International Search Report dated Aug. 22, 2019, in connection with PCT International Application No. PCT/CN2019/099417.

Written Opinion dated Oct. 24, 2019, in connection with PCT International Application No. PCT/CN2019/099417.

* cited by examiner

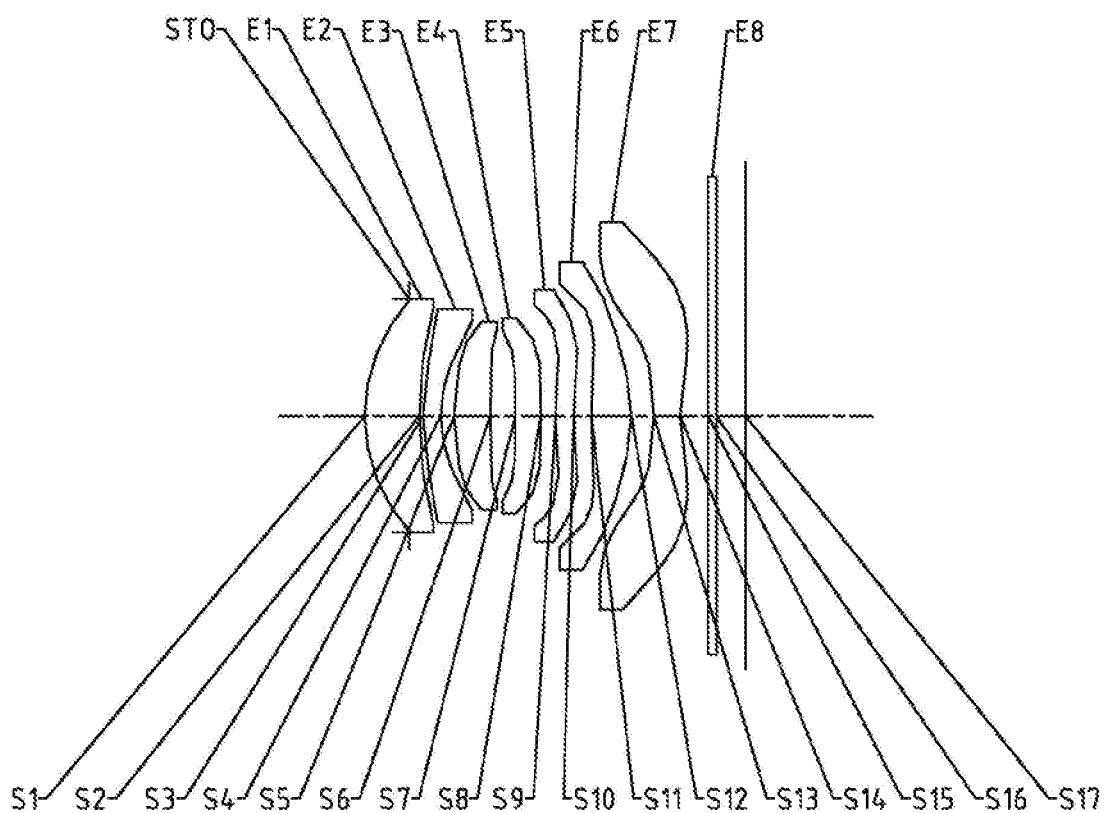
Fig. 1
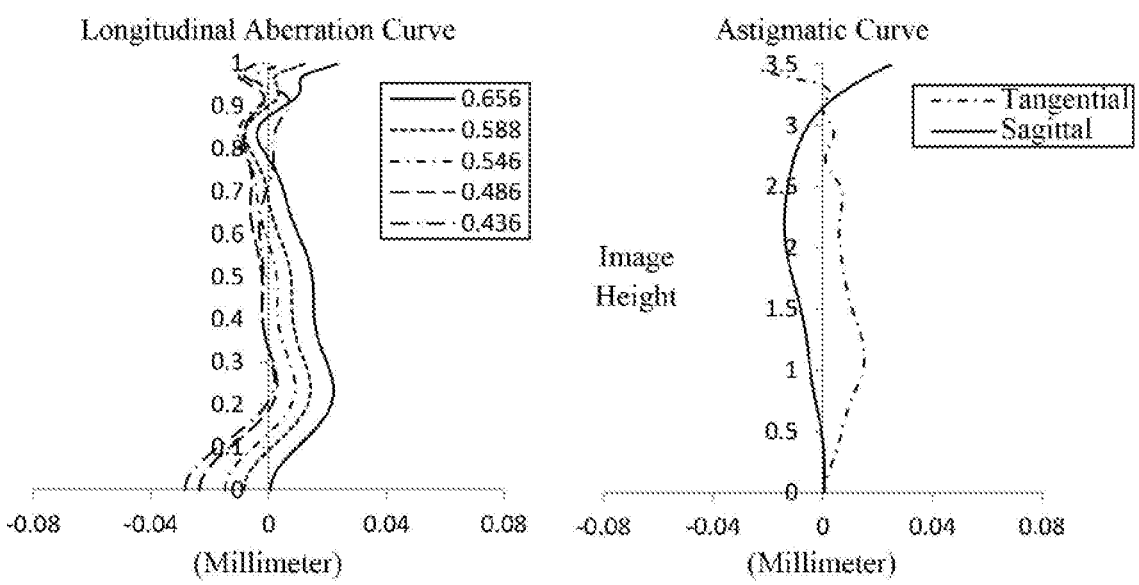
Fig. 2A                    Fig. 2B

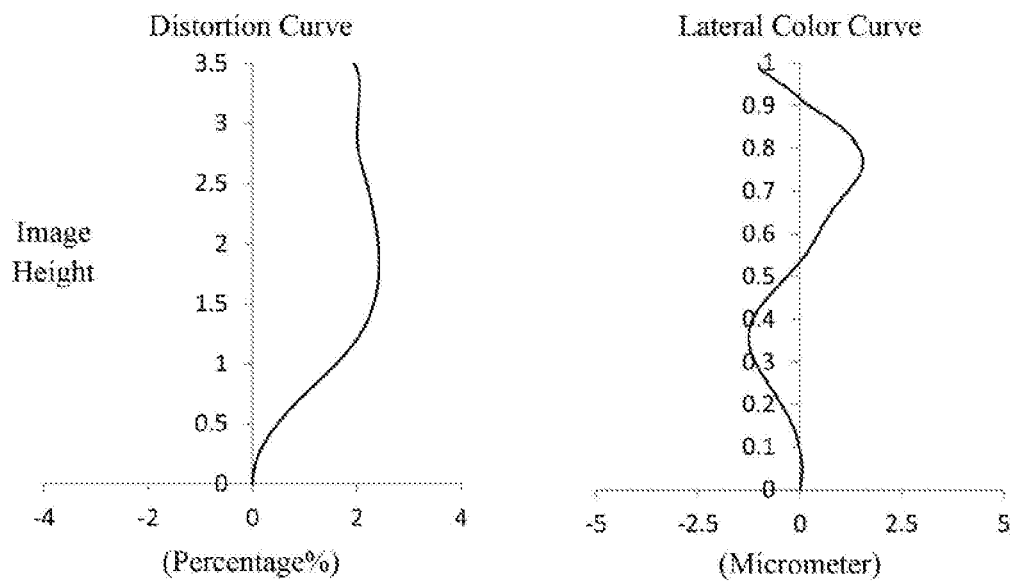
Fig. 2C
Fig. 2D
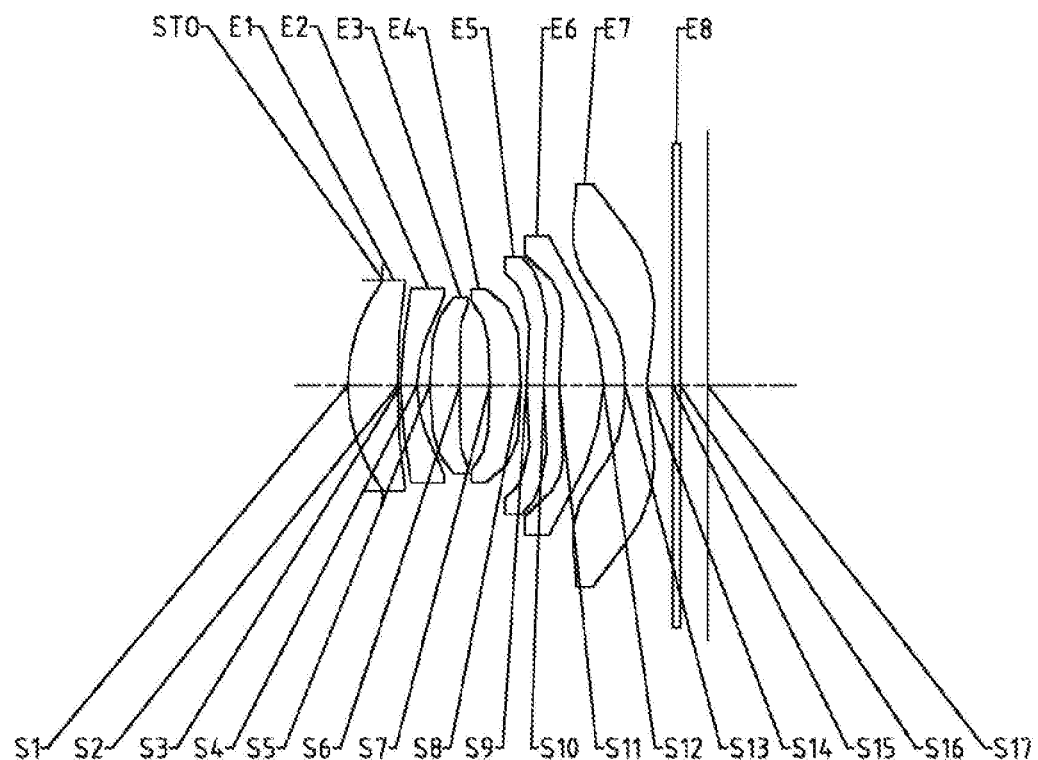
Fig. 3

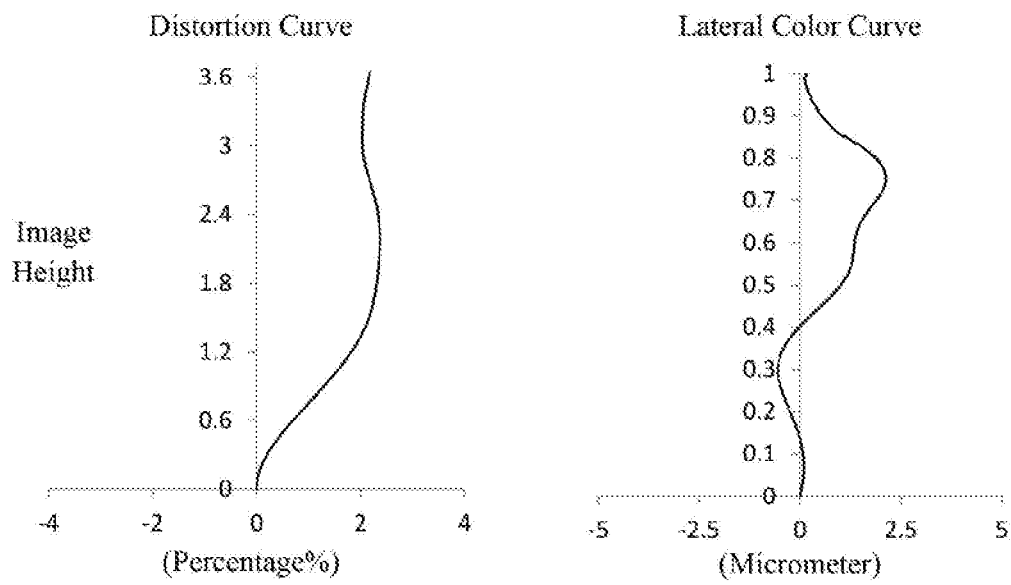
Fig. 6C
Fig. 6D
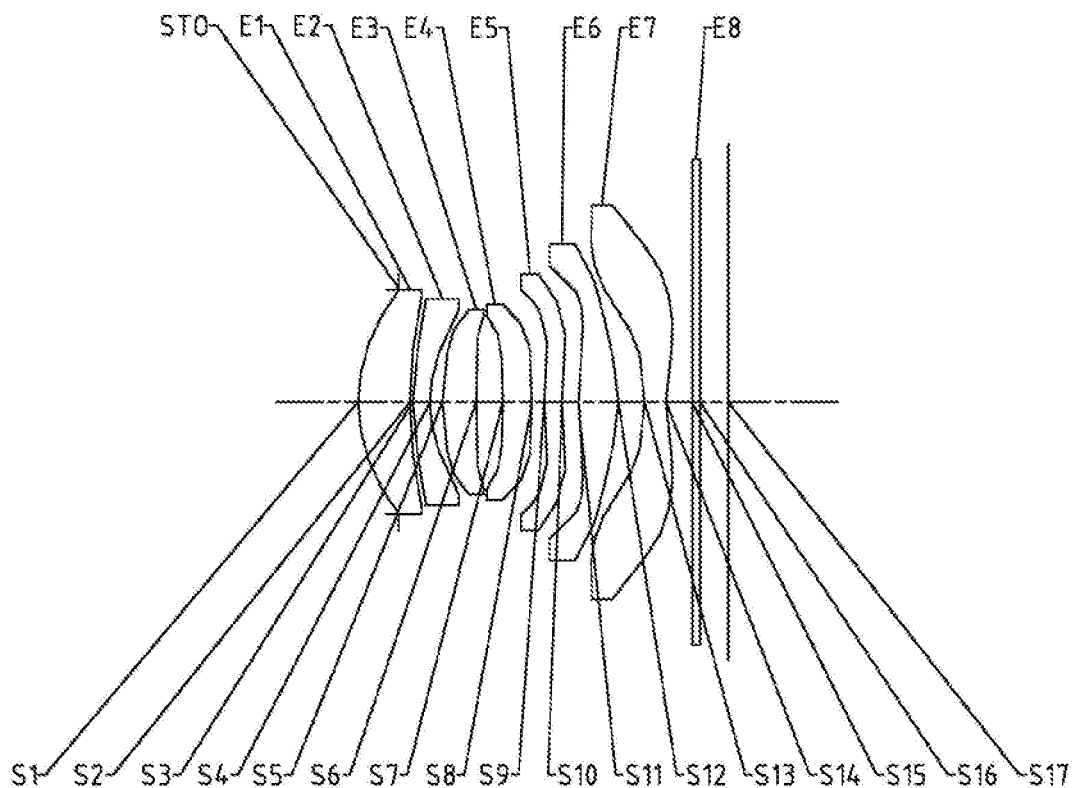
Fig. 7

OPTICAL IMAGING SYSTEM

CROSS-REFERENCE TO RELATED APPLICATIONS

The present patent application is a continuation of International Application No. PCT/CN2019/099417, filed on Aug. 6, 2019, which claims priority to Chinese Patent Application No. 201811448647.5, filed before the China National Intellectual Property Administration (CNIPA) on Nov. 28, 2018. Both of the aforementioned patent applications are hereby incorporated by reference in their entireties.

TECHNICAL FIELD

The present disclosure relates to an optical imaging system, and more specifically, relates to an optical imaging system including seven lenses.

BACKGROUND

With the development of science and technology, the portable electronic product have gradually emerged, and the portable electronic products with camera functions have been more favored by people. Therefore, the market demand for the camera lens assembly suitable for the portable electronic product has gradually increased. On the one hand, as the portable electronic product, such as smart phone, tends to be miniaturized, the total length of the lens assembly is limited, thereby increasing the design difficulty of the lens assembly. On the other hand, as the performance of common photosensitive elements, such as Charge Coupled Device (CCD) and Complementary Metal-Oxide Semiconductor (CMOS), has been increased and the size thereof has been reduced, the number of pixels of the photosensitive element has been increased and the size of the pixel has been decreased, which puts forward higher requirements on high imaging quality and miniaturization of the applicable camera lens assembly.

In order to obtain a small depth of field and achieve a shooting effect with a blurred background under a large aperture, the optical imaging system with large aperture that may clearly image in dim light has been favored by consumers. However, the imaging system with large aperture tends to have larger lens aperture and larger total system length due the large aperture. The optical imaging system with large-aperture in the prior art is difficult to achieve large-aperture imaging while ensuring a smaller lens aperture and total system length.

SUMMARY

The present disclosure provides an optical imaging system, such as an imaging lens assembly with large aperture, that is applicable to portable electronic products and at least solves or partially solves at least one of the above disadvantages of the prior art.

The present disclosure provides an optical imaging system including, sequentially from an object side to an image side along an optical axis, a first lens, a second lens, a third lens, a fourth lens, a fifth lens, a sixth lens and a seventh lens, each of the first to the seventh lens has refractive power. The first lens may have positive refractive power, and the first lens may be a lens made of glass; an object-side surface of the second lens may be a convex surface, and an image-side surface thereof may be a concave surface; each of the fourth lens and the fifth lens may have negative refractive power.

In one embodiment, an aperture value Fno of the optical imaging system may satisfy Fno<1.4.

In one embodiment, an effective focal length f3 of the third lens and an effective focal length f1 of the first lens may satisfy $1.5<f3/f1\leq4$.

In one embodiment, an effective focal length f7 of the seventh lens and an effective focal length f6 of the sixth lens may satisfy $-1.5<f7/f6<-0.5$.

In one embodiment, a radius of curvature R1 of an object-side surface of the first lens and a radius of curvature R5 of an object-side surface of the third lens may satisfy $0.5\leq R1/R5<1$.

In one embodiment, a radius of curvature R3 of the object-side surface of the second lens and a radius of curvature R4 of the image-side surface of the second lens may satisfy $1.5<R3/R4<3.5$.

In one embodiment, a radius of curvature R10 of an image-side surface of the fifth lens and a radius of curvature R12 of an image-side surface of the sixth lens may satisfy $-4.0\leq R10/R12<-0.5$.

In one embodiment, a center thickness CT6 of the sixth lens along the optical axis and a center thickness CT2 of the second lens along the optical axis may satisfy $2.0<CT6/CT2<3.0$.

In one embodiment, SAG31, being an on-axis distance from an intersection of an object-side surface of the third lens and the optical axis to a vertex of an effective half-aperture of the object-side surface of the third lens, and SAG41, being an on-axis distance from an intersection of an object-side surface of the fourth lens and the optical axis to a vertex of an effective half-aperture of the object-side surface of the fourth lens, may satisfy $-3.5<SAG31/SAG41<-1.5$.

In one embodiment, a spaced interval T67 between the sixth lens and the seventh lens along the optical axis and a spaced interval T23 between the second lens and the third lens along the optical axis may satisfy $1.5\leq T67/T23<2.5$.

In one embodiment, an edge thickness ET3 of the third lens and a center thickness CT3 of the third lens along the optical axis may satisfy $0<ET3/CT3\leq0.5$.

In one embodiment, an on-axis distance TTL from an object-side surface of the first lens to an imaging plane of the optical imaging system and half of a diagonal length ImgH of an effective pixel area on the imaging plane of the optical imaging system may satisfy $TTL/ImgH\leq1.6$.

The present disclosure employs a plurality of (for example, seven) lenses, and the optical imaging system has at least one beneficial effect, such as ultra-thinness, miniaturization, large aperture, and high image quality and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 1 illustrates a schematic structural view of an optical imaging system according to example 1 of the present disclosure; and FIGS. 2A to 2D illustrate a longitudinal aberration curve, an astigmatic curve, a distortion curve, and a lateral color curve of the optical imaging system of the example 1, respectively.

FIG. 3 illustrates a schematic structural view of an optical imaging system according to example 2 of the present disclosure.

FIGS. 6A to 6D illustrate a longitudinal aberration curve, an astigmatic curve, a distortion curve, and a lateral color curve of the optical imaging system of the example 3, respectively.

FIG. 7 illustrates a schematic structural view of an optical imaging system according to example 4 of the present disclosure.

DETAILED DESCRIPTION OF EMBODIMENTS

Figure 4A:
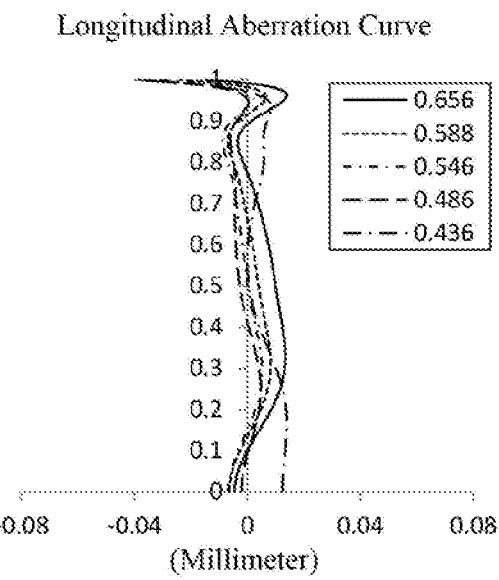
FIGS. 4A to 4D illustrate a longitudinal aberration curve, an astigmatic curve, a distortion curve, and a lateral color curve of the optical imaging system of the example 2, respectively.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging system according to an exemplary embodiment of the present disclosure may include, for example, seven lenses having refractive power, which are a first lens, a second lens, a third lens, a fourth lens, a fifth lens, a sixth lens and a seventh lens. The seven lenses are arranged sequentially from an object side to an image side along an optical axis. Among the first lens to the seventh lens, there may be an air interval between each two adjacent lenses.

In an exemplary embodiment, the first lens may have positive refractive power; the second lens has refractive power, an object-side surface thereof may be a convex surface, and an image-side surface thereof may be a concave surface; the third lens has refractive power; the fourth lens may have negative refractive power; the fifth lens may have negative refractive power; the sixth lens has refractive power; and the seventh lens has refractive power. The first lens may be a lens made of glass. By reasonably configuring the refractive power and surface shape of each lens, it is beneficial to ensure the manufacturability of the lens and avoid the size of the optical imaging lens assembly being too large.

In an exemplary embodiment, the second lens may have negative refractive power.

In an exemplary embodiment, an image-side surface of the seventh lens may be a concave surface.

In an exemplary embodiment, the optical imaging system according to the present disclosure may satisfy: Fno<1.4, where Fno is an aperture value of the optical imaging system. More specifically, Fno may further satisfy: 1.25≤Fno≤1.35, for example, 1.29≤Fno≤1.32. Satisfying the conditional expression Fno<1.4 is beneficial to achieving the imaging with large-aperture, such that the system may obtain clear image in weak light environment.

In an exemplary embodiment, the optical imaging system according to the present disclosure may satisfy: 1.5<f3/f1≤4, where f3 is an effective focal length of the third lens, and f1 is an effective focal length of the first lens. More specifically, f3 and f1 may further satisfy: 1.97≤f3/f1≤3.55. By reasonably controlling the refractive power of the first lens and the third lens, it is beneficial to avoid excessive light deflection and correct the field curvature of the system. The third lens may have positive refractive power.

In an exemplary embodiment, the optical imaging system according to the present disclosure may satisfy: −1.5<f7/f6<−0.5, where f7 is an effective focal length of the seventh lens, and f6 is an effective focal length of the sixth lens. More specifically, f7 and f6 may further satisfy: −1.20≤f7/f6≤−0.80, for example, −1.02≤f7/f6≤−0.92. By reasonably controlling the refractive power of the sixth lens and the seventh lens, it is beneficial to reduce the chromatic aberration, reduce the total length of the system, and enlarge the aperture of the system. Optionally, the seventh lens may have negative refractive power, and the sixth lens may have positive refractive power.

In an exemplary embodiment, the optical imaging system according to the present disclosure may satisfy: 1.5<R3/R4<3.5, where R3 is a radius of curvature of the object-side surface of the second lens, and R4 is a radius of curvature of the image-side surface of the second lens. More specifically, R3 and R4 may further satisfy: 1.85≤R3/R4≤3.43. By reasonably controlling the radii of curvature of the object-side surface and the image-side surface of the second lens, excessive curvature of the second lens is avoided, which is beneficial to reducing the processing difficulty. At the same time, the optical imaging lens assembly has a better ability to compensate chromatic aberration and distortion.

In an exemplary embodiment, the optical imaging system according to the present disclosure may satisfy: 0.5≤R1/R5<1, where R1 is a radius of curvature of an object-side surface of the first lens, and R5 is a radius of curvature of an object-side surface of the third lens. More specifically, R1 and R5 may further satisfy: 0.5≤R1/R5≤0.8, for example, 0.51≤R1/R5≤0.63. By reasonably controlling the radius of curvature of the third lens, excessive curvature of the object-side surface of the third lens is avoided, which is beneficial to reducing the processing difficulty and reducing the chromatic aberration of the system. Optionally, the object-side surface of the first lens may be a convex surface, and the object-side surface of the third lens is a convex surface.

In an exemplary embodiment, the optical imaging system according to the present disclosure may satisfy: −4.0≤R10/R12<−0.5, where R10 is a radius of curvature of an image-side surface of the fifth lens, and R12 is a radius of curvature of an image-side surface of the sixth lens. More specifically, R10 and R12 may further satisfy: −3.94≤R10/R12≤−0.64. By reasonably controlling the radius of curvature of the image-side surface of the fifth lens and the radius of curvature of the image-side surface of the sixth lens, it is beneficial to decrease the refractive power of the image-side surface of each lens in the optical imaging lens assembly, so that the lens assembly has a better ability to compensate chromatic aberration and distortion. Optionally, the image-side surface of the fifth lens may be a concave surface, and the image-side surface of the sixth lens may be a convex surface.

In an exemplary embodiment, the optical imaging system according to the present disclosure may satisfy: 2.0<CT6/CT2<3.0, where CT6 is a center thickness of the sixth lens along the optical axis, and CT2 is a center thickness of the second lens along the optical axis. More specifically, CT6 and CT2 may further satisfy: 2.28≤CT6/CT2≤2.72. By reasonably controlling the thickness of the lens, the lens system has enough interval space, so that the lens surface has a higher degree of design freedom, thereby improving the ability of the optical imaging lens assembly to correct astigmatic and field curvature.

In an exemplary embodiment, the optical imaging system according to the present disclosure may satisfy: −3.5<SAG31/SAG41<−1.5, where SAG31 is an on-axis distance from an intersection of an object-side surface of the third lens and the optical axis to a vertex of an effective half-aperture of the object-side surface of the third lens, and SAG41 is an on-axis distance from an intersection of an object-side surface of the fourth lens and the optical axis to a vertex of an effective half-aperture of the object-side surface of the fourth lens. More specifically, SAG31 and SAG41 may further satisfy: −3.07≤SAG31/SAG41≤−1.75. When the conditional expression −3.5<SAG31/SAG41<−1.5 is satisfied, it is beneficial to adjust the chief ray angle of the system, so as to may effectively improve the relative brightness of the system, thereby ensuring the system clear imaging.

In an exemplary embodiment, the optical imaging system according to the present disclosure may satisfy: 1.5≤T67/T23<2.5, where T67 is a spaced interval between the sixth lens and the seventh lens along the optical axis, and T23 is a spaced interval between the second lens and the third lens along the optical axis. More specifically, T67 and T23 may further satisfy: 1.65≤T67/T23≤2.37. By reasonably controlling the interval between the second lens and the third lens and the interval between the sixth lens and the seventh lens, the intervals between the lenses is prevented from being too small, which is beneficial to reducing the difficulty of assembling the lens system.

In an exemplary embodiment, the optical imaging system according to the present disclosure may satisfy: 0<ET3/CT3≤0.5, where ET3 is an edge thickness of the third lens, and CT3 is a center thickness of the third lens along the optical axis. More specifically, ET3 and CT3 may further satisfy: 0.3<ET3/CT3≤0.5, for example, 0.40≤ET3/CT3≤0.44. Reasonably controlling the edge thickness of the third lens is beneficial to reducing the difficulty of processing and assembly.

In an exemplary embodiment, the optical imaging system according to the present disclosure may satisfy: TTL/ImgH≤1.6, where TTL is an on-axis distance from an object-side surface of the first lens to an imaging plane of the optical imaging system, and ImgH is half of a diagonal length of an effective pixel area on the imaging plane of the optical imaging system. More specifically, TTL and ImgH may further satisfy: 1.46≤TTL/ImgH≤1.57. By reasonably controlling the total length and image height of the lens system, the image height may be prevented from being too small. At the same time, it is conducive to the miniaturization of the system.

In an exemplary embodiment, the optical imaging system may further include a stop to improve the image quality of the imaging system. The stop may be disposed at any position between the object side and the image side as required, for example, the stop may be disposed between the object side and the first lens.

Optionally, the above optical imaging system may further include an optical filter for correcting the color deviation and/or a protective glass for protecting the photosensitive element located on an imaging plane.

The optical imaging system according to the above embodiments of the present disclosure may employ a plurality of lenses, such as seven lenses as described above. By properly configuring the refractive power of each lens, the surface shape, the center thickness of each lens, and spaced intervals along the optical axis between the lenses, the size and the sensitivity of the system may be effectively reduced, and the workability of the system may be improved, such that the optical imaging system is more advantageous for production processing and may be applied to portable electronic products. In addition, the optical imaging system configured as described above may also have beneficial effects such as ultra-thinness, miniaturization, large aperture, and high image quality.

In the embodiments of the present disclosure, at least one of the surfaces of lenses is aspheric, that is, at least one of the object-side surface and the image-side surface of each of the first lens, the second lens, the third lens, the fourth lens, the fifth lens, the sixth lens and the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, the object-side surface and the image-side surface of each of the first lens, the second lens, the third lens, the fourth lens, the fifth lens, the sixth lens and the seventh lens are aspheric.

However, it will be understood by those skilled in the art that the number of lenses constituting the optical imaging system may be varied to achieve the various results and advantages described in this specification without departing from the technical solution claimed by the present disclosure. For example, although the embodiment is described by taking seven lenses as an example, the optical imaging system is not limited to include seven lenses. The optical imaging system may also include other numbers of lenses if desired.

Some specific examples of an optical imaging system applicable to the above embodiment will be further described below with reference to the accompanying drawings.

Example 1

An optical imaging system according to example 1 of the present disclosure is described below with reference to FIG. 1 to FIG. 2D. FIG. 1 shows a schematic structural view of the optical imaging system according to example 1 of the present disclosure.

As shown in FIG. 1, the optical imaging system according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The first lens E1 is a lens made of glass. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 1 shows surface type, radius of curvature, thickness, material and conic coefficient of each lens of the optical imaging system in example 1, wherein the units for the radius of curvature and the thickness are millimeter (mm).

TABLE 1

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.6070 | | | |
| S1 | Aspheric | 2.3316 | 0.7511 | 1.81 | 46.6 | −0.0143 |
| S2 | Aspheric | 6.6078 | 0.0500 | | | −0.4456 |
| S3 | Aspheric | 3.0657 | 0.2400 | 1.67 | 20.4 | 0.0118 |
| S4 | Aspheric | 1.6579 | 0.1848 | | | 0.0106 |
| S5 | Aspheric | 3.7303 | 0.4972 | 1.55 | 56.1 | 0.0828 |
| S6 | Aspheric | 17.7591 | 0.3394 | | | 1.0000 |
| S7 | Aspheric | 60.5266 | 0.3493 | 1.55 | 56.1 | −96.2154 |
| S8 | Aspheric | 17.9405 | 0.1994 | | | −86.2976 |
| S9 | Aspheric | 2.9770 | 0.2500 | 1.67 | 20.4 | −62.6618 |
| S10 | Aspheric | 2.8026 | 0.2414 | | | −44.5099 |
| S11 | Aspheric | 9.7751 | 0.5479 | 1.55 | 56.1 | −28.8388 |
| S12 | Aspheric | −2.0130 | 0.3048 | | | −7.0286 |
| S13 | Aspheric | −5.4841 | 0.3639 | 1.54 | 55.8 | −23.4298 |
| S14 | Aspheric | 2.1940 | 0.3846 | | | −0.4983 |
| S15 | Spherical | Infinite | 0.1100 | 1.52 | 64.2 | |
| S16 | Spherical | Infinite | 0.4000 | | | |
| S17 | Spherical | Infinite | | | | |

As can be seen from Table 1, the object-side surface and the image-side surface of any one of the first lens E1 to the seventh lens E7 are aspheric. In this example, the surface shape x of each aspheric lens may be defined by using, but not limited to, the following aspheric formula:

$$x = \frac{ch^2}{1+\sqrt{1-(k+1)c^2h^2}} + \sum A_i h^i \qquad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient (given in the above Table 1); Ai is a correction coefficient for the i-th order of the aspheric surface. Table 2 below shows high-order coefficients A4, A6, A8, A10, A12, A14, A16, A18 and A20 applicable to each aspheric surface S1 to S14 in example 1.

TABLE 2

| Surface number | A4 | A6 | A8 | A10 | A12 | A14 | A16 | A18 | A20 |
|---|---|---|---|---|---|---|---|---|---|
| S1 | −4.0066E−03 | 1.2735E−02 | −3.4504E−02 | 5.4075E−02 | −5.2064E−02 | 3.0948E−02 | −1.1088E−02 | 2.1983E−03 | −1.8580E−04 |
| S2 | −4.3280E−02 | 1.8515E−01 | −3.2931E−01 | 3.5206E−01 | −2.4013E−01 | 1.0367E−01 | −2.6733E−02 | 3.5760E−03 | −1.7018E−04 |
| S3 | −1.5978E−01 | 4.1998E−01 | −7.4176E−01 | 8.3695E−01 | −6.2899E−01 | 3.1132E−01 | −9.6820E−02 | 1.7005E−02 | −1.2717E−03 |
| S4 | −1.3588E−01 | 2.3029E−01 | −3.3108E−01 | 2.7430E−01 | −1.1512E−01 | −8.3020E−04 | 2.3162E−02 | −1.0351E−02 | 1.7231E−03 |
| S5 | −1.4972E−02 | 7.8149E−02 | −1.4137E−01 | 2.5765E−01 | −3.2424E−01 | 2.7509E−01 | −1.4393E−01 | 4.1074E−02 | −4.7899E−03 |
| S6 | −2.2295E−02 | 3.1658E−02 | −8.6715E−02 | 2.1699E−01 | −3.2174E−01 | 3.1121E−01 | −1.8407E−01 | 6.1976E−02 | −8.8326E−03 |
| S7 | −8.7269E−02 | 8.7943E−02 | −3.0726E−01 | 5.1636E−01 | −5.3061E−01 | 3.1079E−01 | −7.7148E−02 | −7.3171E−03 | 5.4031E−03 |
| S8 | −1.4320E−01 | 1.3863E−01 | −1.8278E−01 | 5.5454E−02 | 9.3832E−02 | −1.2679E−01 | 7.5329E−02 | −2.3810E−02 | 3.1997E−03 |
| S9 | 2.6524E−02 | −4.3892E−01 | 1.1026E+00 | −1.5924E+00 | 1.4011E+00 | −7.8674E−01 | 2.8171E−01 | −5.9443E−02 | 5.6280E−03 |
| S10 | 2.8368E−02 | −3.8035E−01 | 7.2867E−01 | −7.7443E−01 | 4.8487E−01 | −1.8157E−01 | 3.9719E−02 | −4.6366E−03 | 2.1988E−04 |
| S11 | 5.2908E−02 | −9.6107E−02 | −6.7968E−02 | 2.4036E−01 | −2.4290E−01 | 1.3060E−01 | −4.0401E−02 | 6.7693E−03 | −4.7391E−04 |
| S12 | 9.6624E−02 | −7.1569E−02 | −8.5305E−02 | 1.5685E−01 | −1.0161E−01 | 3.4923E−02 | −6.7867E−03 | 7.0647E−04 | −3.0703E−05 |
| S13 | −3.8502E−02 | −1.5546E−01 | 1.3961E−01 | −5.4109E−02 | 1.2033E−02 | −1.6483E−03 | 1.3860E−04 | −6.6317E−06 | 1.4009E−07 |
| S14 | −1.7943E−01 | 5.1658E−02 | −4.8699E−03 | −3.9882E−03 | 2.1799E−03 | −5.5264E−04 | 7.8322E−05 | −5.8590E−06 | 1.7883E−07 |

Table 3 shows effective focal lengths f1 to f7 of respective lens, a total effective focal length f of the optical imaging system, a distance TTL along the optical axis from the object-side surface S1 of the first lens E1 to the imaging plane 517, half of a diagonal length ImgH of an effective pixel area on the imaging plane 517, and half of a maximal field-of-view Semi-FOV of the optical imaging system in example 1.

TABLE 3

| f1 (mm) | 4.13 | f7 (mm) | −2.87 |
|---|---|---|---|
| f2 (mm) | −5.80 | f (mm) | 4.15 |
| f3 (mm) | 8.53 | TTL (mm) | 5.21 |
| f4 (mm) | −46.79 | ImgH (mm) | 3.50 |
| f5 (mm) | −168.13 | Semi-FOV (°) | 39.4 |
| f6 (mm) | 3.11 | | |

FIG. 2A illustrates a longitudinal aberration curve of the optical imaging system according to example 1, representing deviations of focal points converged by light of different wavelengths after passing through the system. FIG. 2B illustrates an astigmatic curve of the optical imaging system according to example 1, representing a curvature of a tangential plane and a curvature of a sagittal plane. FIG. 2C illustrates a distortion curve of the optical imaging system according to example 1, representing amounts of distortion corresponding to different image heights. FIG. 2D illustrates a lateral color curve of the optical imaging system according to example 1, representing deviations of different image heights on an imaging plane after light passes through the system. It can be seen from FIG. 2A to FIG. 2D that the optical imaging system provided in example 1 may achieve good image quality.

Example 2

An optical imaging system according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging system according to example 2 of the present disclosure.

As shown in FIG. 3, the optical imaging system according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a convex surface. The first lens E1 is a lens made of glass. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 4 shows surface type, radius of curvature, thickness, material and conic coefficient of each lens of the optical imaging system in example 2, wherein the units for the radius of curvature and the thickness are millimeter (mm).

TABLE 4

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.5100 | | | |
| S1 | Aspheric | 2.4747 | 0.7349 | 1.81 | 46.6 | −0.0705 |
| S2 | Aspheric | −400.0000 | 0.0400 | | | −99.0000 |
| S3 | Aspheric | 6.2646 | 0.2400 | 1.67 | 20.4 | 7.6728 |
| S4 | Aspheric | 1.8255 | 0.1854 | | | 0.0620 |
| S5 | Aspheric | 4.8538 | 0.4412 | 1.55 | 56.1 | 5.6682 |
| S6 | Aspheric | 26.4609 | 0.4428 | | | −4.9891 |
| S7 | Aspheric | −14.5323 | 0.4502 | 1.55 | 56.1 | −1.4324 |
| S8 | Aspheric | 53.5790 | 0.0884 | | | −99.0000 |
| S9 | Aspheric | 2.9193 | 0.2500 | 1.67 | 20.4 | −64.9719 |
| S10 | Aspheric | 2.7963 | 0.2246 | | | −43.6037 |
| S11 | Aspheric | 5.9712 | 0.6506 | 1.55 | 56.1 | −99.0000 |
| S12 | Aspheric | −1.7565 | 0.3137 | | | −5.7400 |
| S13 | Aspheric | −3.7519 | 0.3229 | 1.54 | 55.8 | −27.4669 |
| S14 | Aspheric | 2.1238 | 0.3797 | | | −0.5620 |
| S15 | Spherical | Infinite | 0.1100 | 1.52 | 64.2 | |
| S16 | Spherical | Infinite | 0.4000 | | | |
| S17 | Spherical | Infinite | | | | |

As can be seen from Table 4, in example 2, the object-side surface and the image-side surface of any one of the first lens E1 to the seventh lens E7 are aspheric. Table 5 shows high-order coefficients applicable to each aspheric surface in example 2, wherein the surface shape of each aspheric surface may be defined by the formula (1) given in the above example 1.

TABLE 5

| Surface number | A4 | A6 | A8 | A10 | A12 | A14 | A16 | A18 | A20 |
|---|---|---|---|---|---|---|---|---|---|
| S1 | −3.6842E−03 | 5.7195E−03 | −1.0058E−02 | 8.4109E−03 | −2.7979E−03 | −7.0608E−04 | 8.8576E−04 | −2.6528E−04 | 2.6913E−05 |
| S2 | 1.4386E−01 | −2.9858E−01 | 4.9152E−01 | −5.7788E−01 | 4.6413E−01 | −2.4699E−01 | 8.2799E−02 | −1.5754E−02 | 1.2898E−03 |
| S3 | 1.4913E−01 | −3.9826E−01 | 6.8042E−01 | −8.1614E−01 | 6.5586E−01 | −3.4710E−01 | 1.1599E−01 | −2.2095E−02 | 1.8192E−03 |
| S4 | −2.7780E−02 | −3.9463E−02 | 8.6884E−02 | −9.5429E−02 | 2.9712E−02 | 3.7668E−02 | −4.8154E−02 | 2.1153E−02 | −3.3028E−03 |
| S5 | 1.4072E−02 | −3.0075E−02 | 1.5924E−01 | −3.0890E−01 | 3.9319E−01 | −3.0668E−01 | 1.4144E−01 | −3.5739E−02 | 3.9191E−03 |
| S6 | −1.0286E−03 | −2.5204E−02 | 1.4936E−01 | −3.8853E−01 | 6.8001E−01 | −7.3630E−01 | 4.8239E−01 | −1.7234E−01 | 2.5832E−02 |
| S7 | −2.3639E−02 | −1.1676E−01 | 2.7562E−01 | −6.0956E−01 | 9.1299E−01 | −9.0525E−01 | 5.6383E−01 | −1.9804E−01 | 2.9657E−02 |
| S8 | −1.0998E−01 | −1.0719E−01 | 5.1554E−01 | −1.0563E+00 | 1.1591E+00 | −7.5526E−01 | 2.9792E−01 | −6.6744E−02 | 6.5723E−03 |
| S9 | 8.2029E−02 | −8.7173E−01 | 2.3182E+00 | −3.3841E+00 | 2.9386E+00 | −1.5613E+00 | 4.9999E−01 | −8.8928E−02 | 6.7610E−03 |
| S10 | 4.6435E−02 | −4.7272E−01 | 8.9910E−01 | −9.3241E−01 | 5.7642E−01 | −2.1677E−01 | 4.8640E−02 | −5.9987E−03 | 3.1358E−04 |
| S11 | 9.3546E−02 | −1.7833E−01 | 9.8615E−02 | 1.1694E−02 | −4.8847E−02 | 2.8592E−02 | −8.1851E−03 | 1.2154E−03 | −7.4970E−05 |
| S12 | 8.9335E−02 | −5.4855E−02 | −7.0992E−02 | 1.1272E−01 | −6.7989E−02 | 2.2161E−02 | −4.0972E−03 | 4.0454E−04 | −1.6594E−05 |
| S13 | −6.7194E−02 | −9.9279E−02 | 9.3971E−02 | −3.4321E−02 | 6.9380E−03 | −8.3626E−04 | 5.9070E−05 | −2.1983E−06 | 3.1299E−08 |
| S14 | −1.9585E−01 | 8.1356E−02 | −2.7681E−02 | 7.1258E−03 | −1.3366E−03 | 1.6489E−04 | −1.1878E−05 | 4.2096E−07 | −4.7872E−09 |

Table 6 shows effective focal lengths f1 to f7 of respective lens, a total effective focal length f of the optical imaging system, a distance TTL along the optical axis from the object-side surface S1 of the first lens E1 to the imaging plane 517, half of a diagonal length ImgH of an effective pixel area on the imaging plane S17, and half of a maximal field-of-view Semi-FOV of the optical imaging system in example 2.

TABLE 6

| | | | |
|---|---|---|---|
| f1 (mm) | 3.05 | f7 (mm) | −2.48 |
| f2 (mm) | −3.94 | f (mm) | 4.07 |
| f3 (mm) | 10.80 | TTL (mm) | 5.27 |
| f4 (mm) | −20.87 | ImgH (mm) | 3.60 |
| f5 (mm) | −533.53 | Semi-FOV (°) | 40.8 |
| f6 (mm) | 2.56 | | |

Figure 4B:
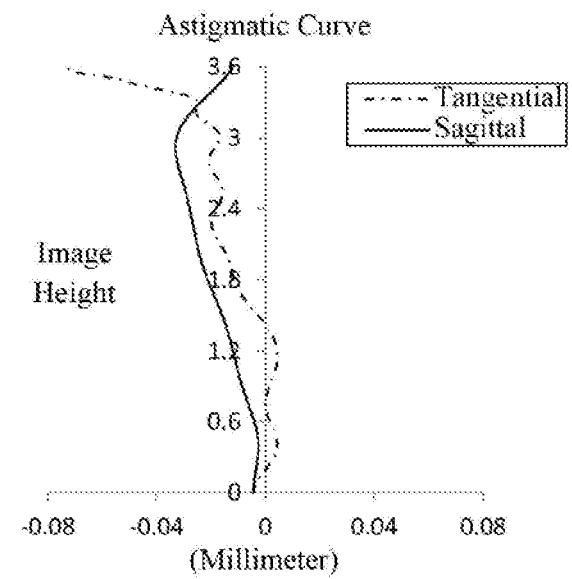
Figure 4C:
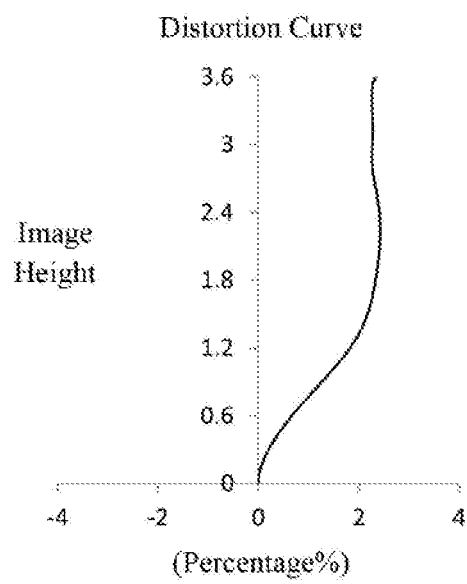
Figure 4D:
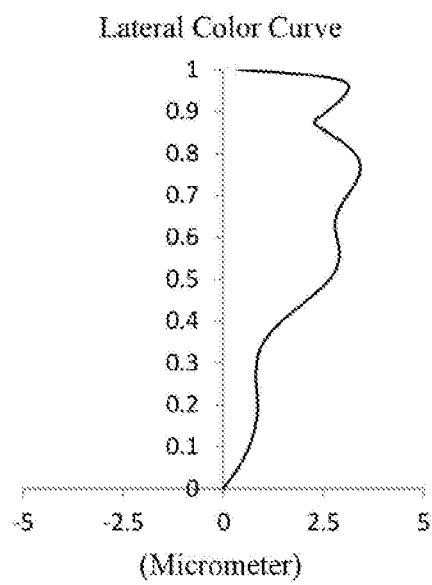

FIG. 4A illustrates a longitudinal aberration curve of the optical imaging system according to example 2, representing deviations of focal points converged by light of different wavelengths after passing through the system. FIG. 4B illustrates an astigmatic curve of the optical imaging system according to example 2, representing a curvature of a tangential plane and a curvature of a sagittal plane. FIG. 4C illustrates a distortion curve of the optical imaging system according to example 2, representing amounts of distortion corresponding to different image heights. FIG. 4D illustrates a lateral color curve of the optical imaging system according to example 2, representing deviations of different image heights on an imaging plane after light passes through the system. It can be seen from FIG. 4A to FIG. 4D that the optical imaging system provided in example 2 may achieve good image quality.

Example 3

Figure 5:
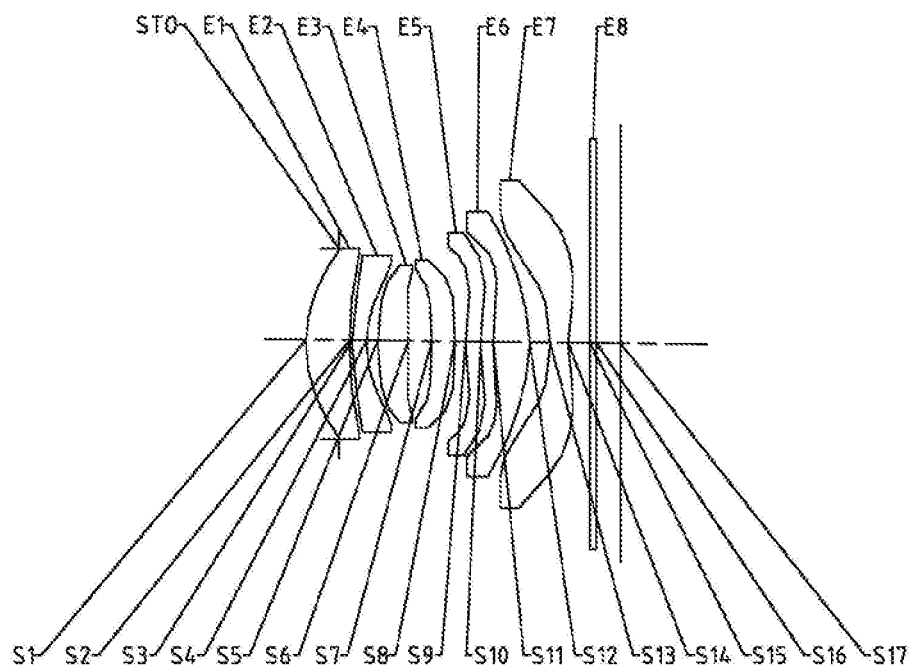
FIG. 5 illustrates a schematic structural view of an optical imaging system according to example 3 of the present disclosure.

An optical imaging system according to example 3 of the present disclosure is described below with reference to FIG. 5 to FIG. 6D. FIG. 5 shows a schematic structural view of the optical imaging system according to example 3 of the present disclosure.

As shown in FIG. 5, the optical imaging system according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The first lens E1 is a lens made of glass. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 7 shows surface type, radius of curvature, thickness, material and conic coefficient of each lens of the optical imaging system in example 3, wherein the units for the radius of curvature and the thickness are millimeter (mm).

TABLE 7

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.5549 | | | |
| S1 | Aspheric | 2.3977 | 0.7297 | 1.81 | 46.6 | −0.0779 |
| S2 | Aspheric | 8.1411 | 0.0400 | | | −0.4318 |
| S3 | Aspheric | 3.4303 | 0.2400 | 1.67 | 20.4 | 0.0781 |
| S4 | Aspheric | 1.7368 | 0.1904 | | | −0.0170 |
| S5 | Aspheric | 4.4776 | 0.5071 | 1.55 | 56.1 | 2.8945 |
| S6 | Aspheric | −100.0000 | 0.3943 | | | −99.0000 |
| S7 | Aspheric | −16.4114 | 0.3857 | 1.55 | 56.1 | −8.1758 |
| S8 | Aspheric | 101.7999 | 0.1763 | | | −99.0000 |
| S9 | Aspheric | 2.7250 | 0.2500 | 1.67 | 20.4 | −43.1612 |
| S10 | Aspheric | 2.4349 | 0.2127 | | | −29.6023 |
| S11 | Aspheric | 5.4326 | 0.6060 | 1.55 | 56.1 | −58.2014 |
| S12 | Aspheric | −2.1708 | 0.3392 | | | −6.2313 |
| S13 | Aspheric | −4.3598 | 0.3000 | 1.54 | 55.8 | −16.7994 |
| S14 | Aspheric | 2.3006 | 0.3647 | | | −0.4960 |
| S15 | Spherical | Infinite | 0.1100 | 1.52 | 64.2 | |
| S16 | Spherical | Infinite | 0.4000 | | | |
| S17 | Spherical | Infinite | | | | |

As can be seen from Table 7, in example 3, the object-side surface and the image-side surface of any one of the first lens E1 to the seventh lens E7 are aspheric. Table 8 shows high-order coefficients applicable to each aspheric surface in example 3, wherein the surface shape of each aspheric surface may be defined by the formula (1) given in the above example 1.

TABLE 8

| Surface number | A4 | A6 | A8 | A10 | A12 | A14 | A16 | A18 | A20 |
|---|---|---|---|---|---|---|---|---|---|
| S1 | −5.0629E−03 | 1.6826E−02 | −4.5304E−02 | 7.0183E−02 | −6.6705E−02 | 3.9205E−02 | −1.3920E−02 | 2.7380E−03 | −2.2988E−04 |
| S2 | −3.3256E−02 | 1.6626E−01 | −3.0364E−01 | 3.3544E−01 | −2.3996E−01 | 1.1050E−01 | −3.1272E−02 | 4.8406E−03 | −3.0255E−04 |
| S3 | −1.3202E−01 | 3.5322E−01 | −6.1542E−01 | 6.7802E−01 | −4.9328E−01 | 2.3209E−01 | −6.6736E−02 | 1.0375E−02 | −6.3123E−04 |
| S4 | −1.1035E−01 | 1.7481E−01 | −2.3796E−01 | 1.7887E−01 | −5.2707E−02 | −2.7482E−02 | 3.0071E−02 | −1.0970E−02 | 1.6250E−03 |
| S5 | −4.4320E−03 | 3.7630E−02 | −1.4861E−02 | −1.9126E−02 | 6.7432E−02 | −7.0922E−02 | 3.8868E−02 | −1.1619E−02 | 1.5672E−03 |
| S6 | −2.7189E−03 | −6.3268E−02 | 2.7557E−01 | −6.2713E−01 | 9.2009E−01 | −8.4494E−01 | 4.7404E−01 | −1.4663E−01 | 1.9285E−02 |
| S7 | −5.4590E−02 | −4.1262E−02 | 7.6498E−02 | −2.2005E−01 | 4.0560E−01 | −4.6136E−01 | 3.1385E−01 | −1.1706E−01 | 1.8363E−02 |
| S8 | −1.1474E−01 | 2.4603E−02 | 6.4092E−02 | −2.7571E−01 | 3.8856E−01 | −2.9665E−01 | 1.3292E−01 | −3.3269E−02 | 3.6078E−03 |
| S9 | 1.6226E−02 | −3.0238E−01 | 7.1008E−01 | −9.3221E−01 | 7.2657E−01 | −3.5267E−01 | 1.0685E−01 | −1.8875E−02 | 1.5016E−03 |
| S10 | 2.4022E−02 | −3.2291E−01 | 6.0436E−01 | −6.1524E−01 | 3.6951E−01 | −1.3445E−01 | 2.9151E−02 | −3.4685E−03 | 1.7462E−04 |
| S11 | 6.1682E−02 | −1.3719E−01 | 3.4258E−02 | 9.8043E−02 | −1.2372E−01 | 6.8767E−02 | −2.0860E−02 | 3.3445E−03 | −2.2113E−04 |
| S12 | 9.6000E−02 | −8.9341E−02 | −1.8694E−02 | 7.0103E−02 | −4.5619E−02 | 1.4794E−02 | −2.6650E−03 | 2.5548E−04 | −1.0201E−05 |
| S13 | −9.9603E−02 | −5.9772E−02 | 7.4096E−02 | −2.9322E−02 | 6.3559E−03 | −8.3826E−04 | 6.7703E−05 | −3.1124E−06 | 6.2995E−08 |
| S14 | −2.0793E−01 | 9.7917E−02 | −3.7724E−02 | 1.0838E−02 | −2.2427E−03 | 3.1094E−04 | −2.6999E−05 | 1.3480E−06 | −3.0551E−08 |

Table 9 shows effective focal lengths f1 to f7 of respective lens, a total effective focal length f of the optical imaging system, a distance TTL along the optical axis from the object-side surface S1 of the first lens E1 to the imaging plane S17, half of a diagonal length ImgH of an effective pixel area on the imaging plane S17, and half of a maximal field-of-view Semi-FOV of the optical imaging system in example 3.

TABLE 9

| f1 (mm) | 3.98 | f7 (mm) | −2.76 |
|---|---|---|---|
| f2 (mm) | −5.59 | f (mm) | 4.11 |
| f3 (mm) | 7.86 | TTL (mm) | 5.25 |
| f4 (mm) | −25.83 | ImgH (mm) | 3.35 |
| f5 (mm) | −52.30 | Semi-FOV (°) | 40.8 |
| f6 (mm) | 2.92 | | |

Figure 6A:
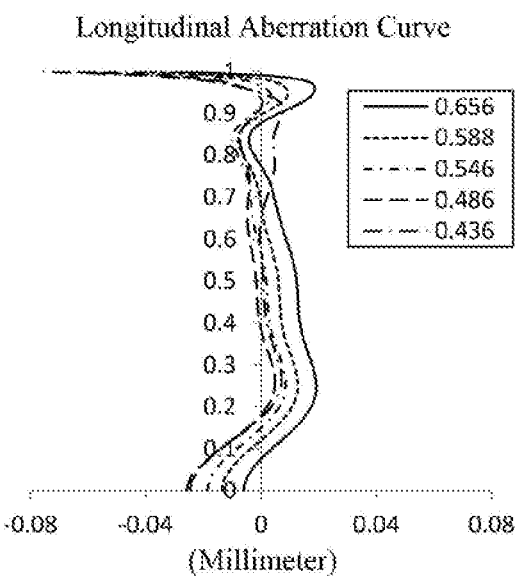
Figure 6B:
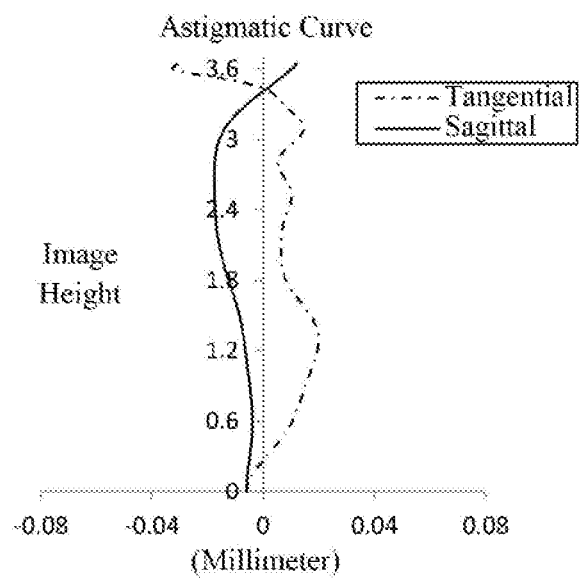

FIG. 6A illustrates a longitudinal aberration curve of the optical imaging system according to example 3, representing deviations of focal points converged by light of different wavelengths after passing through the system. FIG. 6B illustrates an astigmatic curve of the optical imaging system according to example 3, representing a curvature of a tangential plane and a curvature of a sagittal plane. FIG. 6C illustrates a distortion curve of the optical imaging system according to example 3, representing amounts of distortion corresponding to different image heights. FIG. 6D illustrates a lateral color curve of the optical imaging system according to example 3, representing deviations of different image heights on an imaging plane after light passes through the system. It can be seen from FIG. 6A to FIG. 6D that the optical imaging system provided in example 3 may achieve good image quality.

Example 4

An optical imaging system according to example 4 of the present disclosure is described below with reference to FIG. 7 to FIG. 8D. FIG. 7 shows a schematic structural view of the optical imaging system according to example 4 of the present disclosure.

As shown in FIG. 7, the optical imaging system according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The first lens E1 is a lens made of glass. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 10 shows surface type, radius of curvature, thickness, material and conic coefficient of each lens of the optical imaging system in example 4, wherein the units for the radius of curvature and the thickness are millimeter (mm).

TABLE 10

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.5715 | | | |
| S1 | Aspheric | 2.3619 | 0.7295 | 1.81 | 46.6 | −0.0877 |
| S2 | Aspheric | 6.8280 | 0.0400 | | | −4.8226 |
| S3 | Aspheric | 3.4063 | 0.2400 | 1.67 | 20.4 | 0.2097 |
| S4 | Aspheric | 1.7766 | 0.1771 | | | 0.0379 |
| S5 | Aspheric | 3.7486 | 0.4758 | 1.55 | 56.1 | 0.9062 |
| S6 | Aspheric | 16.4707 | 0.3774 | | | 24.9498 |
| S7 | Aspheric | −40.7203 | 0.4097 | 1.55 | 56.1 | 3.2231 |
| S8 | Aspheric | 101.2594 | 0.1754 | | | 18.7171 |
| S9 | Aspheric | 3.0146 | 0.2511 | 1.67 | 20.4 | −62.9007 |
| S10 | Aspheric | 2.6421 | 0.2286 | | | −37.9448 |
| S11 | Aspheric | 5.5106 | 0.5617 | 1.55 | 56.1 | −34.9133 |
| S12 | Aspheric | −2.1779 | 0.3716 | | | −9.7368 |
| S13 | Aspheric | −4.5281 | 0.3042 | 1.54 | 55.8 | −32.1865 |
| S14 | Aspheric | 2.3186 | 0.3689 | | | −0.4682 |
| S15 | Spherical | Infinite | 0.1100 | 1.52 | 64.2 | |
| S16 | Spherical | Infinite | 0.4000 | | | |
| S17 | Spherical | Infinite | | | | |

As can be seen from Table 10, in example 4, the object-side surface and the image-side surface of any one of the first lens E1 to the seventh lens E7 are aspheric. Table 11 shows high-order coefficients applicable to each aspheric surface in example 4, wherein the surface shape of each aspheric surface may be defined by the formula (1) given in the above example 1.

TABLE 11

| Surface number | A4 | A6 | A8 | A10 | A12 | A14 | A16 | A18 | A20 |
|---|---|---|---|---|---|---|---|---|---|
| S1 | −5.3102E−03 | 1.7528E−02 | −4.8682E−02 | 7.6978E−02 | −7.4535E−02 | 4.4455E−02 | −1.5945E−02 | 3.1547E−03 | −2.6472E−04 |
| S2 | −4.4059E−02 | 1.9041E−01 | −3.2743E−01 | 3.3137E−01 | −2.1290E−01 | 8.6420E−02 | −2.1087E−02 | 2.7333E−03 | −1.3489E−04 |
| S3 | −1.4315E−01 | 3.9981E−01 | −6.6793E−01 | 6.8138E−01 | −4.4461E−01 | 1.7897E−01 | −4.0149E−02 | 3.7472E−03 | 3.1448E−05 |
| S4 | −1.1346E−01 | 1.8867E−01 | −2.1618E−01 | 6.2615E−02 | 1.4496E−01 | −2.0762E−01 | 1.2361E−01 | −3.7099E−02 | 4.6834E−03 |
| S5 | −2.0179E−02 | 6.2145E−02 | −8.4447E−02 | 1.2045E−01 | −1.1573E−01 | 8.5228E−02 | −4.2806E−02 | 1.1968E−02 | −1.2944E−03 |
| S6 | −1.3424E−02 | −1.1936E−02 | 7.3242E−02 | −1.7024E−01 | 2.7236E−01 | −2.6313E−01 | 1.5419E−01 | −4.8667E−02 | 6.5365E−03 |
| S7 | −5.1672E−02 | −2.6747E−02 | 3.4680E−02 | −1.7848E−01 | 4.0058E−01 | −4.9882E−01 | 3.5832E−01 | −1.3861E−01 | 2.2309E−02 |
| S8 | −1.1689E−01 | 5.8124E−02 | −1.1568E−02 | −1.8406E−01 | 3.1054E−01 | −2.4824E−01 | 1.1358E−01 | −2.9138E−02 | 3.2773E−03 |
| S9 | −4.5099E−03 | −3.3359E−01 | 8.4660E−01 | −1.1858E+00 | 9.7145E−01 | −4.8181E−01 | 1.4427E−01 | −2.4443E−02 | 1.8346E−03 |
| S10 | 2.4179E−03 | −3.5474E−01 | 7.5035E−01 | −8.7049E−01 | 6.0324E−01 | −2.5472E−01 | 6.4317E−02 | −8.9369E−03 | 5.2602E−04 |
| S11 | 6.9601E−02 | −2.1241E−01 | 2.5618E−01 | −1.9325E−01 | 9.2978E−02 | −2.8148E−02 | 4.9392E−03 | −4.2186E−04 | 1.0802E−05 |
| S12 | 5.8880E−02 | −5.4917E−02 | −1.5179E−02 | 5.8091E−02 | −4.1132E−02 | 1.4282E−02 | −2.7188E−03 | 2.7260E−04 | −1.1280E−05 |
| S13 | −1.2335E−01 | −2.6572E−02 | 5.4474E−02 | −2.2129E−02 | 4.5119E−03 | −5.1122E−04 | 3.0408E−05 | −6.9573E−07 | −4.0362E−09 |
| S14 | −1.9834E−01 | 9.0786E−02 | −3.2955E−02 | 8.2859E−03 | −1.3137E−03 | 9.6200E−05 | 2.8534E−06 | −9.0607E−07 | 3.9955E−08 |

Table 12 shows effective focal lengths f1 to f7 of respective lens, a total effective focal length f of the optical imaging system, a distance TTL along the optical axis from the object-side surface S1 of the first lens E1 to the imaging plane S17, half of a diagonal length ImgH of an effective pixel area on the imaging plane S17, and half of a maximal field-of-view Semi-FOV of the optical imaging system in example 4.

TABLE 12

| f1 (mm) | 4.16 | f7 (mm) | −2.81 |
|---|---|---|---|
| f2 (mm) | −5.91 | f (mm) | 4.09 |
| f3 (mm) | 8.76 | TTL (mm) | 5.22 |
| f4 (mm) | −53.09 | ImgH (mm) | 3.55 |
| f5 (mm) | −43.86 | Semi-FOV (°) | 41.0 |
| f6 (mm) | 2.93 | | |

Figure 8A:
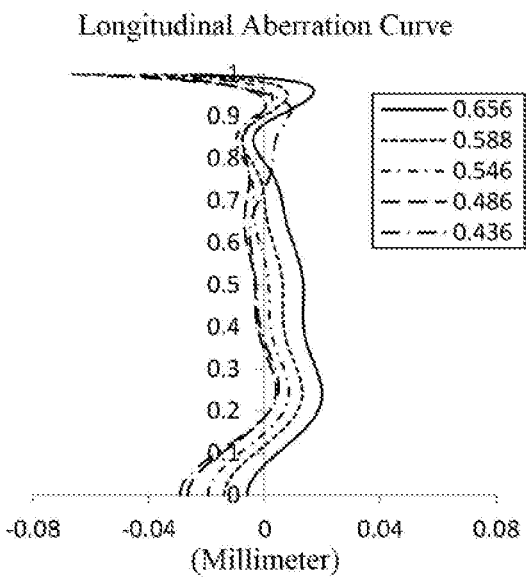
FIGS. 8A to 8D illustrate a longitudinal aberration curve, an astigmatic curve, a distortion curve, and a lateral color curve of the optical imaging system of the example 4, respectively.
Figure 8B:
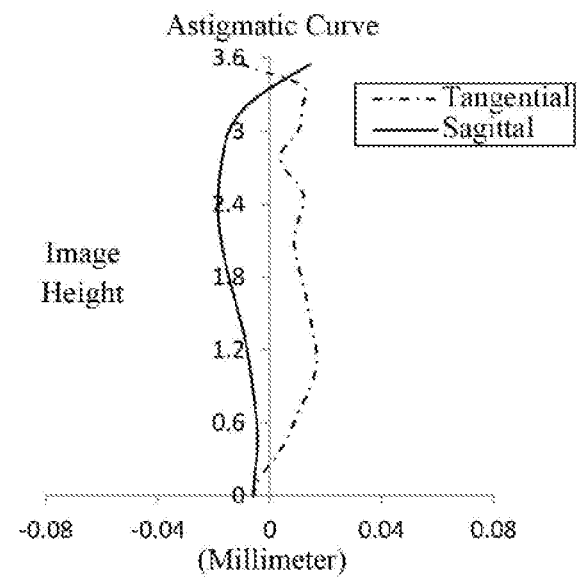
Figure 8C:
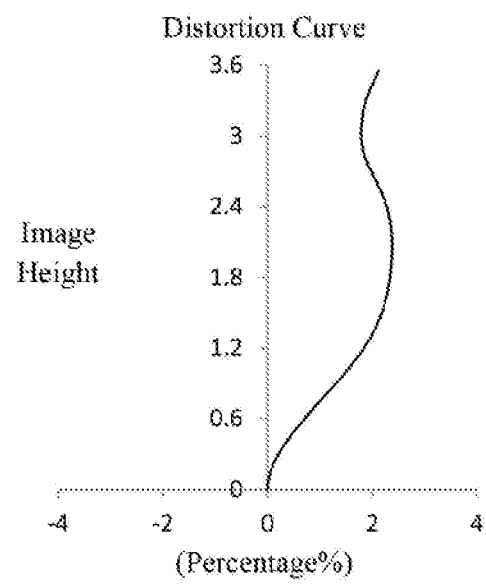
Figure 8D:
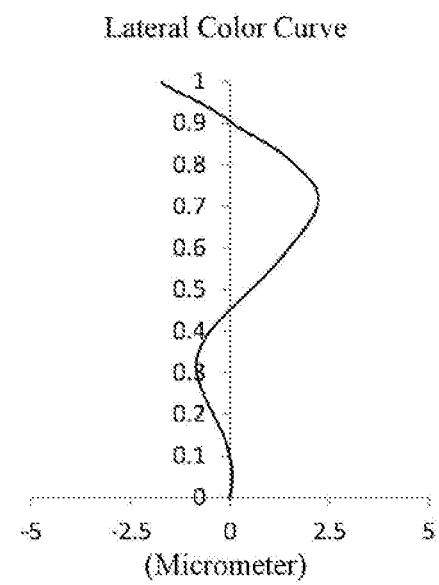

FIG. 8A illustrates a longitudinal aberration curve of the optical imaging system according to example 4, representing deviations of focal points converged by light of different wavelengths after passing through the system. FIG. 8B illustrates an astigmatic curve of the optical imaging system according to example 4, representing a curvature of a tangential plane and a curvature of a sagittal plane. FIG. 8C illustrates a distortion curve of the optical imaging system according to example 4, representing amounts of distortion corresponding to different image heights. FIG. 8D illustrates a lateral color curve of the optical imaging system according to example 4, representing deviations of different image heights on an imaging plane after light passes through the system. It can be seen from FIG. 8A to FIG. 8D that the optical imaging system provided in example 4 may achieve good image quality.

Example 5

Figure 9:
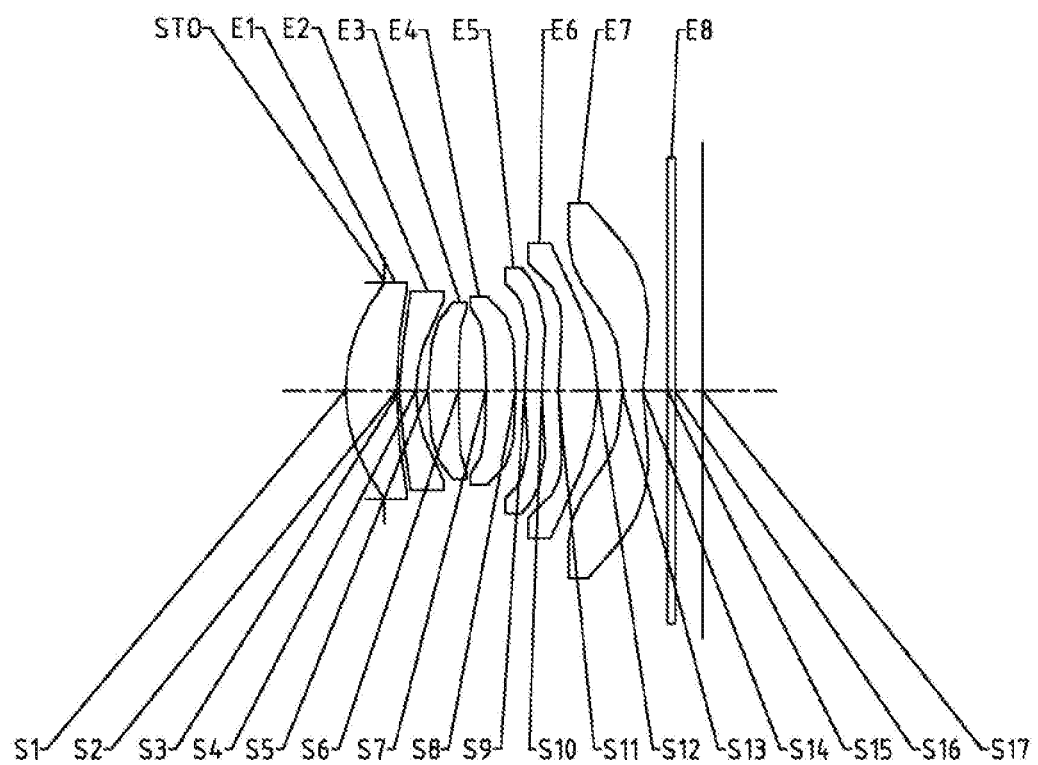
FIG. 9 illustrates a schematic structural view of an optical imaging system according to example 5 of the present disclosure.

An optical imaging system according to example 5 of the present disclosure is described below with reference to FIG. 9 to FIG. 10D. FIG. 9 shows a schematic structural view of the optical imaging system according to example 5 of the present disclosure.

As shown in FIG. 9, the optical imaging system according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The first lens E1 is a lens made of glass. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 13 shows surface type, radius of curvature, thickness, material and conic coefficient of each lens of the optical imaging system in example 5, wherein the units for the radius of curvature and the thickness are millimeter (mm).

TABLE 13

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.5732 | | | |
| S1 | Aspheric | 2.3650 | 0.7536 | 1.81 | 46.6 | −0.0771 |
| S2 | Aspheric | 7.6265 | 0.0400 | | | −4.7185 |
| S3 | Aspheric | 3.7208 | 0.2400 | 1.67 | 20.4 | 0.4873 |
| S4 | Aspheric | 1.8138 | 0.1732 | | | 0.0731 |
| S5 | Aspheric | 3.7497 | 0.4571 | 1.55 | 56.1 | 0.9768 |
| S6 | Aspheric | 14.4691 | 0.4038 | | | 25.0000 |
| S7 | Aspheric | −25.7531 | 0.4328 | 1.55 | 56.1 | −99.0000 |
| S8 | Aspheric | −200.0000 | 0.1342 | | | −99.0000 |
| S9 | Aspheric | 2.9783 | 0.2500 | 1.67 | 20.4 | −61.4367 |
| S10 | Aspheric | 2.7437 | 0.2471 | | | −36.3998 |
| S11 | Aspheric | 7.0065 | 0.5776 | 1.55 | 56.1 | −50.0641 |
| S12 | Aspheric | −2.0377 | 0.3598 | | | −6.0634 |
| S13 | Aspheric | −4.2784 | 0.3000 | 1.54 | 55.8 | −17.3677 |
| S14 | Aspheric | 2.2952 | 0.3653 | | | −0.4462 |
| S15 | Spherical | Infinite | 0.1100 | 1.52 | 64.2 | |
| S16 | Spherical | Infinite | 0.4000 | | | |
| S17 | Spherical | Infinite | | | | |

As can be seen from Table 13, in example 5, the object-side surface and the image-side surface of any one of the first lens E1 to the seventh lens E7 are aspheric. Table 14 shows high-order coefficients applicable to each aspheric surface in example 5, wherein the surface shape of each aspheric surface may be defined by the formula (1) given in the above example 1.

Figures 10A, 10B:
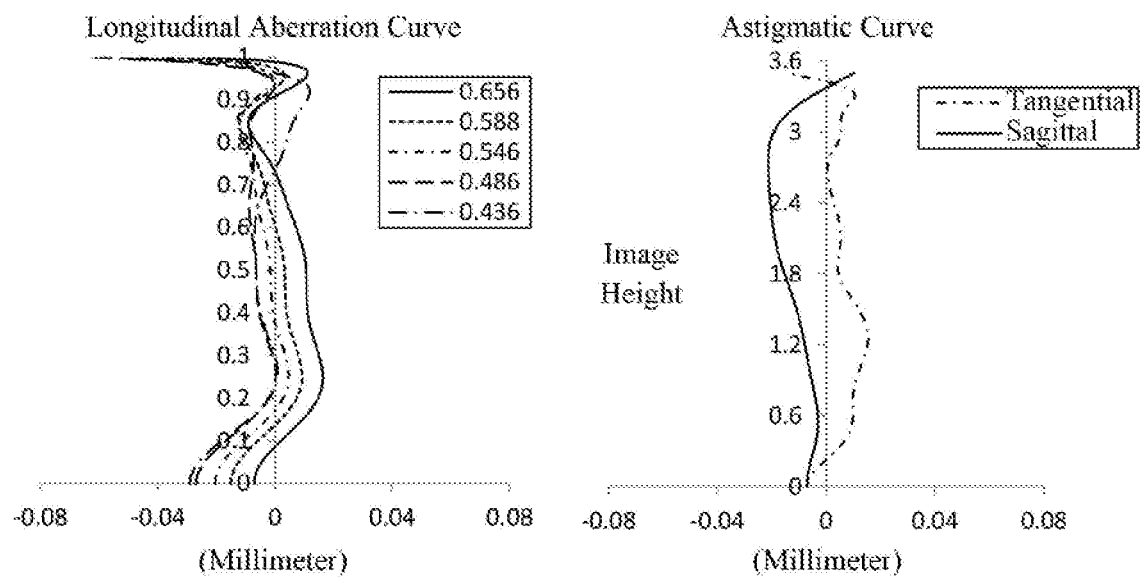
FIGS. 10A to 10D illustrate a longitudinal aberration curve, an astigmatic curve, a distortion curve, and a lateral color curve of the optical imaging system of the example 5, respectively.
Figure 10C:
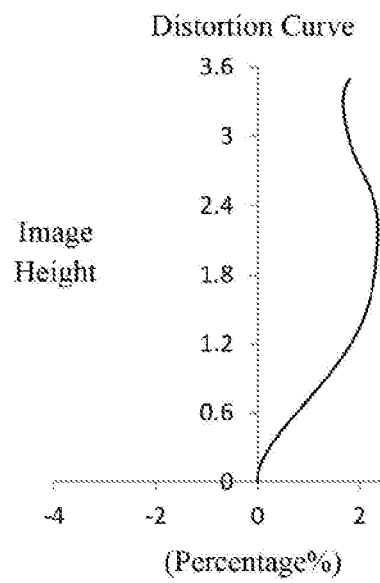
Figure 10D:
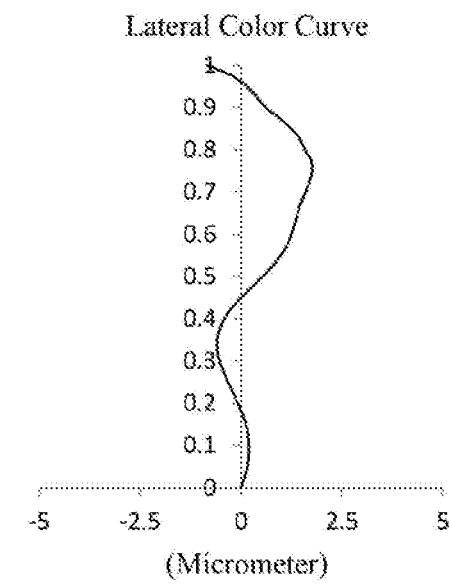

FIG. 10A illustrates a longitudinal aberration curve of the optical imaging system according to example 5, representing deviations of focal points converged by light of different wavelengths after passing through the system. FIG. 10B illustrates an astigmatic curve of the optical imaging system according to example 5, representing a curvature of a tangential plane and a curvature of a sagittal plane. FIG. 10C

TABLE 14

| Surface number | A4 | A6 | A8 | A10 | A12 | A14 | A16 | A18 | A20 |
|---|---|---|---|---|---|---|---|---|---|
| S1 | −4.4051E−03 | 1.3060E−02 | −3.5834E−02 | 5.5479E−02 | −5.2407E−02 | 3.0425E−02 | −1.0626E−02 | 2.0494E−03 | −1.6802E−04 |
| S2 | −3.7631E−02 | 1.9187E−01 | −3.5951E−01 | 4.0187E−01 | −2.9598E−01 | 1.4360E−01 | −4.3918E−02 | 7.6198E−03 | −5.6619E−04 |
| S3 | −1.3081E−01 | 4.0775E−01 | −7.3498E−01 | 8.2170E−01 | −6.1445E−01 | 3.0254E−01 | −9.2817E−02 | 1.5861E−02 | −1.1290E−03 |
| S4 | −1.1212E−01 | 2.1894E−01 | −3.2557E−01 | 2.8872E−01 | −1.4420E−01 | 1.9283E−02 | 1.7490E−02 | −9.8448E−03 | 1.7131E−03 |
| S5 | −2.2708E−02 | 6.5389E−02 | −7.9116E−02 | 1.0127E−01 | −7.9702E−02 | 4.4840E−02 | −1.7530E−02 | 3.8118E−03 | −2.2535E−04 |
| S6 | −8.6125E−03 | −3.8994E−02 | 1.8973E−01 | −4.6256E−01 | 7.2732E−01 | −7.0576E−01 | 4.1641E−01 | −1.3526E−01 | 1.8754E−02 |
| S7 | −3.1123E−02 | −6.3067E−02 | 1.1406E−01 | −3.1098E−01 | 5.6002E−01 | −6.3518E−01 | 4.3332E−01 | −1.6174E−01 | 2.5287E−02 |
| S8 | −8.6937E−02 | −5.4755E−02 | 2.8689E−01 | −6.3243E−01 | 7.1937E−01 | −4.8525E−01 | 1.9996E−01 | −4.7243E−02 | 4.9337E−03 |
| S9 | 5.1357E−02 | −5.4136E−01 | 1.2600E+00 | −1.6555E+00 | 1.3106E+00 | −6.4781E−01 | 1.9928E−01 | −3.5547E−02 | 2.8397E−03 |
| S10 | 3.6336E−02 | −4.2391E−01 | 7.9717E−01 | −8.2133E−01 | 5.0253E−01 | −1.8600E−01 | 4.0796E−02 | −4.8791E−03 | 2.4538E−04 |
| S11 | 6.7740E−02 | −1.5091E−01 | 6.2470E−02 | 5.8962E−02 | −9.1398E−02 | 5.2572E−02 | −1.6061E−02 | 2.5767E−03 | −1.7022E−04 |
| S12 | 8.0834E−02 | −7.0306E−02 | −3.7547E−02 | 8.6596E−02 | −5.5578E−02 | 1.8408E−02 | −3.4126E−03 | 3.3680E−04 | −1.3816E−05 |
| S13 | −1.1311E−01 | −4.8498E−02 | 7.2443E−02 | −3.0273E−02 | 6.8412E−03 | −9.3816E−04 | 7.8589E−05 | −3.7252E−06 | 7.6945E−08 |
| S14 | −2.1195E−01 | 1.0059E−01 | −3.7747E−02 | 1.0150E−02 | −1.8827E−03 | 2.1970E−04 | −1.4179E−05 | 3.9031E−07 | −9.0509E−10 |

Table 15 shows effective focal lengths f1 to f7 of respective lens, a total effective focal length f of the optical imaging system, a distance TTL along the optical axis from the object-side surface S1 of the first lens E1 to the imaging plane S17, half of a diagonal length ImgH of an effective pixel area on the imaging plane S17, and half of a maximal field-of-view Semi-FOV of the optical imaging system in example 5.

illustrates a distortion curve of the optical imaging system according to example 5, representing amounts of distortion corresponding to different image heights. FIG. 10D illustrates a lateral color curve of the optical imaging system according to example 5, representing deviations of different image heights on an imaging plane after light passes through the system. It can be seen from FIG. 10A to FIG. 10D that the optical imaging system provided in example 5 may achieve good image quality.

Example 6

Figure 11:
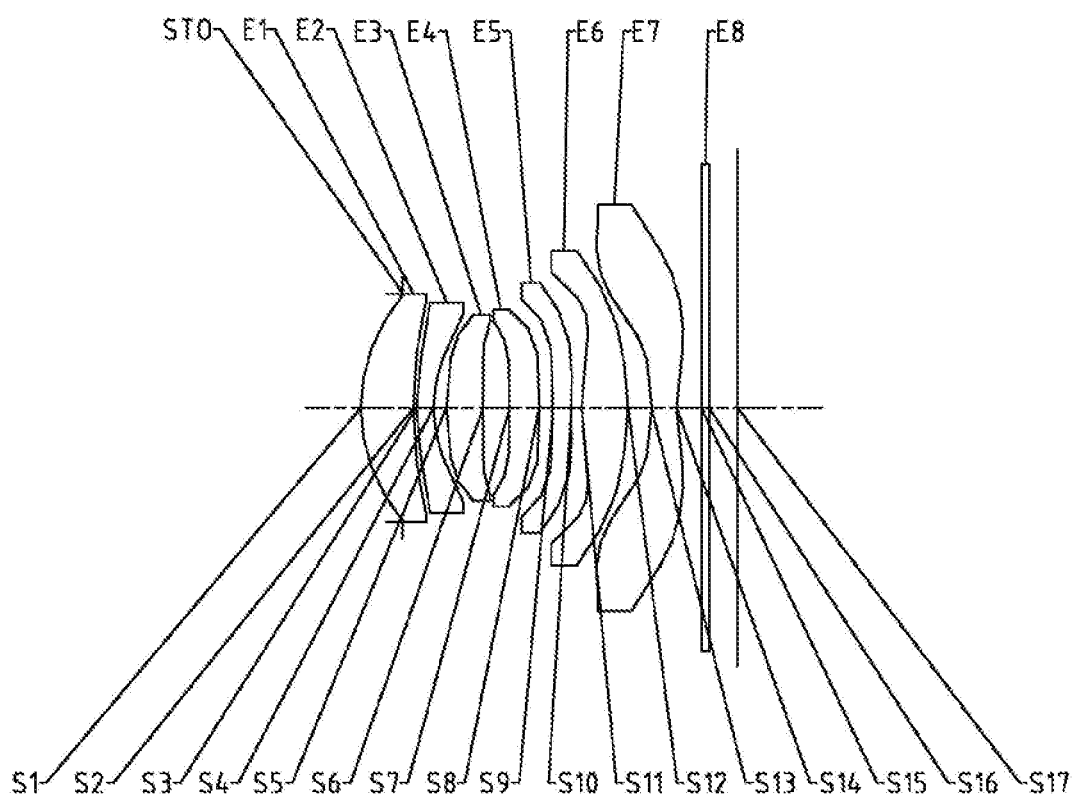
FIG. 11 illustrates a schematic structural view of an optical imaging system according to example 6 of the present disclosure.

An optical imaging system according to example 6 of the present disclosure is described below with reference to FIG. 11 to FIG. 12D. FIG. 11 shows a schematic structural view of the optical imaging system according to example 6 of the present disclosure.

As shown in FIG. 11, the optical imaging system according to an exemplary embodiment of the present disclosure

TABLE 15

| f1 (mm) | 3.99 | f7 (mm) | −2.74 |
|---|---|---|---|
| f2 (mm) | −5.58 | f (mm) | 4.11 |
| f3 (mm) | 9.12 | TTL (mm) | 5.24 |
| f4 (mm) | −54.14 | ImgH (mm) | 3.50 |
| f5 (mm) | −91.02 | Semi-FOV (°) | 40.8 |
| f6 (mm) | 2.96 | | | includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The first lens E1 is a lens made of glass. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 16 shows surface type, radius of curvature, thickness, material and conic coefficient of each lens of the optical imaging system in example 6, wherein the units for the radius of curvature and the thickness are millimeter (mm).

TABLE 16

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.6046 | | | |
| S1 | Aspheric | 2.3748 | 0.7460 | 1.81 | 46.6 | −0.0581 |
| S2 | Aspheric | 7.6745 | 0.0400 | | | −1.0416 |
| S3 | Aspheric | 3.3903 | 0.2400 | 1.67 | 20.4 | 0.4118 |
| S4 | Aspheric | 1.7461 | 0.1847 | | | 0.0449 |
| S5 | Aspheric | 4.0685 | 0.5070 | 1.55 | 56.1 | 1.0135 |
| S6 | Aspheric | 30.1448 | 0.3709 | | | 25.0000 |
| S7 | Aspheric | 180.0662 | 0.3859 | 1.55 | 56.1 | −99.0000 |
| S8 | Aspheric | 154.4671 | 0.2050 | | | −44.4561 |
| S9 | Aspheric | −400.0000 | 0.2500 | 1.67 | 20.4 | −80.4026 |
| S10 | Aspheric | 10.9997 | 0.2256 | | | −55.6175 |
| S11 | Aspheric | 3.8667 | 0.5958 | 1.55 | 56.1 | −33.8418 |
| S12 | Aspheric | −2.7902 | 0.3692 | | | −11.4835 |
| S13 | Aspheric | −5.6659 | 0.3169 | 1.54 | 55.8 | −99.0000 |
| S14 | Aspheric | 2.2415 | 0.3680 | | | −0.5335 |
| S15 | Spherical | Infinite | 0.1100 | 1.52 | 64.2 | |
| S16 | Spherical | Infinite | 0.4000 | | | |
| S17 | Spherical | Infinite | | | | |

As can be seen from Table 16, in example 6, the object-side surface and the image-side surface of any one of the first lens E1 to the seventh lens E7 are aspheric. Table 17 shows high-order coefficients applicable to each aspheric surface in example 6, wherein the surface shape of each aspheric surface may be defined by the formula (1) given in the above example 1.

TABLE 17

| Surface number | A4 | A6 | A8 | A10 | A12 | A14 | A16 | A18 | A20 |
|---|---|---|---|---|---|---|---|---|---|
| S1 | −4.3053E−03 | 1.2721E−02 | −3.2213E−02 | 4.7849E−02 | −4.3885E−02 | 2.4954E−02 | −8.5950E−03 | 1.6476E−03 | −1.3580E−04 |
| S2 | −3.4072E−02 | 1.7869E−01 | −3.3711E−01 | 3.8100E−01 | −2.7739E−01 | 1.2938E−01 | −3.6699E−02 | 5.5851E−03 | −3.3087E−04 |
| S3 | −1.2974E−01 | 3.7301E−01 | −6.7786E−01 | 7.7090E−01 | −5.7926E−01 | 2.8428E−01 | −8.6604E−02 | 1.4609E−02 | −1.0143E−03 |
| S4 | −1.0880E−01 | 1.8774E−01 | −2.8227E−01 | 2.5344E−01 | −1.3264E−01 | 2.8498E−02 | 5.8527E−03 | −5.1396E−03 | 1.0313E−03 |
| S5 | −6.0010E−03 | 5.0026E−02 | −4.5896E−02 | 2.9929E−02 | 1.6735E−02 | −3.9655E−02 | 2.8341E−02 | −1.0089E−02 | 1.5464E−03 |
| S6 | −2.5466E−03 | −6.0341E−02 | 2.8644E−01 | −6.9604E−01 | 1.0823E+00 | −1.0507E+00 | 6.2252E−01 | −2.0407E−01 | 2.8519E−02 |
| S7 | −6.1196E−02 | −5.9983E−02 | 1.4560E−01 | −3.5426E−01 | 5.7086E−01 | −6.0398E−01 | 3.9926E−01 | −1.4773E−01 | 2.3165E−02 |
| S8 | −2.2570E−02 | −2.2841E−01 | 5.1436E−01 | −7.8774E−01 | 7.1369E−01 | −3.8750E−01 | 1.2709E−01 | −2.4163E−02 | 2.1393E−03 |
| S9 | 2.0443E−02 | −4.4474E−01 | 1.0463E+00 | −1.3273E+00 | 9.5304E−01 | −3.8939E−01 | 8.5527E−02 | −8.4382E−03 | 1.8380E−04 |
| S10 | 3.4340E−02 | −6.3017E−01 | 1.2588E+00 | −1.3400E+00 | 8.6358E−01 | −3.4621E−01 | 8.4355E−02 | −1.1426E−02 | 6.5911E−04 |
| S11 | 2.2861E−01 | −6.2447E−01 | 7.8815E−01 | −6.2374E−01 | 3.2800E−01 | −1.1510E−01 | 2.5473E−02 | −3.1572E−03 | 1.6518E−04 |
| S12 | 1.6067E−01 | −1.8801E−01 | 3.9791E−02 | 6.5303E−02 | −5.7260E−02 | 2.0967E−02 | −4.0578E−03 | 4.0745E−04 | −1.6764E−05 |
| S13 | −8.7896E−02 | −1.1041E−01 | 1.3014E−01 | −5.9094E−02 | 1.5356E−02 | −2.4754E−03 | 2.4570E−04 | −1.3798E−05 | 3.3600E−07 |
| S14 | −2.0054E−01 | 7.5709E−02 | −1.3838E−02 | −1.7509E−03 | 1.5661E−03 | −3.7887E−04 | 4.6968E−05 | −2.9992E−06 | 7.7820E−08 |

Table 18 shows effective focal lengths f1 to f7 of respective lens, a total effective focal length f of the optical imaging system, a distance TTL along the optical axis from the object-side surface S1 of the first lens E1 to the imaging plane S17, half of a diagonal length ImgH of an effective pixel area on the imaging plane S17, and half of a maximal field-of-view Semi-FOV of the optical imaging system in example 6.

TABLE 18

| f1 (mm) | 4.00 | f7 (mm) | −2.94 |
|---|---|---|---|
| f2 (mm) | −5.73 | f (mm) | 4.15 |
| f3 (mm) | 8.55 | TTL (mm) | 5.32 |
| f4 (mm) | −1999.67 | ImgH (mm) | 3.60 |
| f5 (mm) | −16.03 | Semi-FOV (°) | 40.5 |
| f6 (mm) | 3.07 | | |

Figure 12A:
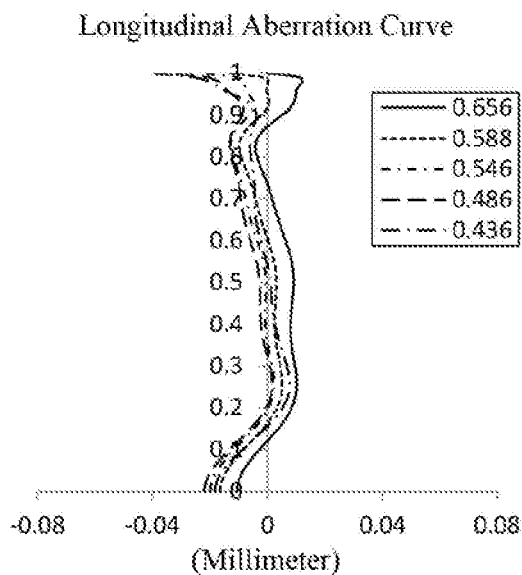
FIGS. 12A to 12D illustrate a longitudinal aberration curve, an astigmatic curve, a distortion curve, and a lateral color curve of the optical imaging system of the example 6, respectively.
Figure 12B:
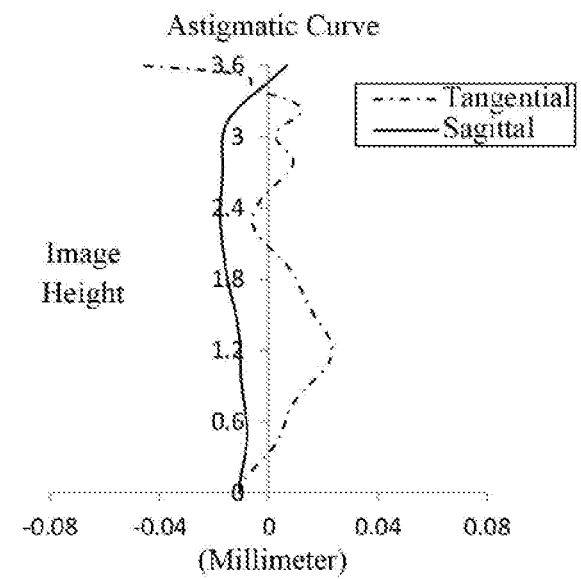
Figure 12C:
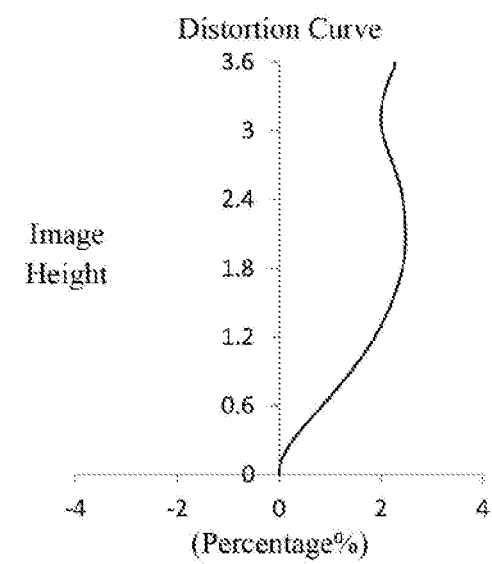
Figure 12D:
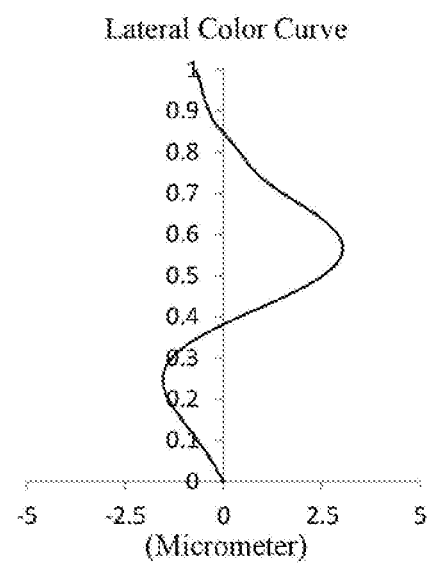

FIG. 12A illustrates a longitudinal aberration curve of the optical imaging system according to example 6, representing deviations of focal points converged by light of different wavelengths after passing through the system. FIG. 12B illustrates an astigmatic curve of the optical imaging system according to example 6, representing a curvature of a tangential plane and a curvature of a sagittal plane. FIG. 12C illustrates a distortion curve of the optical imaging system according to example 6, representing amounts of distortion corresponding to different image heights. FIG. 12D illustrates a lateral color curve of the optical imaging system according to example 6, representing deviations of different image heights on an imaging plane after light passes through the system. It can be seen from FIG. 12A to FIG. 12D that the optical imaging system provided in example 6 may achieve good image quality.

Example 7

Figure 13:
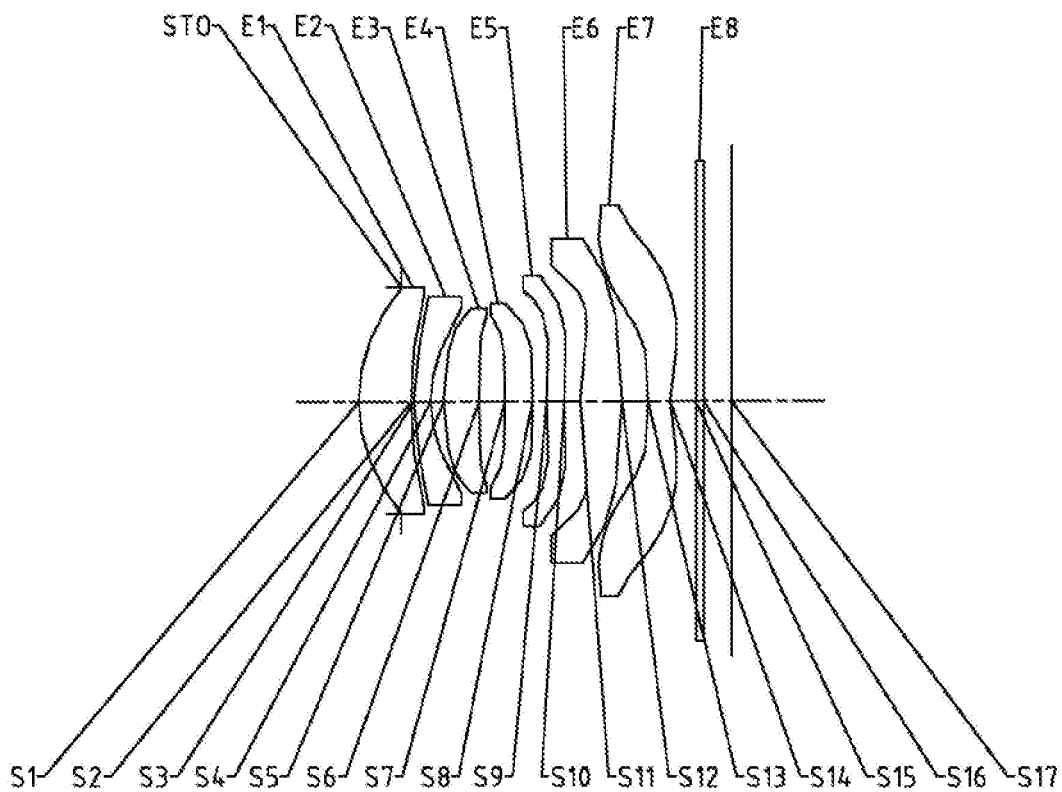
FIG. 13 illustrates a schematic structural view of an optical imaging system according to example 7 of the present disclosure.

An optical imaging system according to example 7 of the present disclosure is described below with reference to FIG. 13 to FIG. 14D. FIG. 13 shows a schematic structural view of the optical imaging system according to example 7 of the present disclosure.

As shown in FIG. 13, the optical imaging system according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The first lens E1 is a lens made of glass. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 19 shows surface type, radius of curvature, thickness, material and conic coefficient of each lens of the optical imaging system in example 7, wherein the units for the radius of curvature and the thickness are millimeter (mm).

TABLE 19

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.6046 | | | |
| S1 | Aspheric | 2.3514 | 0.7460 | 1.81 | 46.6 | −0.0581 |
| S2 | Aspheric | 6.8090 | 0.0400 | | | −1.0416 |
| S3 | Aspheric | 3.3874 | 0.2400 | 1.67 | 20.4 | 0.4118 |
| S4 | Aspheric | 1.7485 | 0.1847 | | | 0.0449 |
| S5 | Aspheric | 3.8013 | 0.5070 | 1.55 | 56.1 | 1.0135 |
| S6 | Aspheric | 17.6789 | 0.3709 | | | 25.0000 |
| S7 | Aspheric | 85.4860 | 0.3859 | 1.55 | 56.1 | −99.0000 |
| S8 | Aspheric | 23.3750 | 0.2050 | | | −44.4561 |
| S9 | Aspheric | 4.1818 | 0.2500 | 1.67 | 20.4 | −80.4026 |
| S10 | Aspheric | 3.3149 | 0.2256 | | | −55.6175 |
| S11 | Aspheric | 3.2388 | 0.5958 | 1.55 | 56.1 | −33.8418 |
| S12 | Aspheric | −5.1730 | 0.3692 | | | −11.4835 |
| S13 | Aspheric | 400.0000 | 0.3169 | 1.54 | 55.8 | −99.0000 |
| S14 | Aspheric | 2.0355 | 0.3680 | | | −0.5335 |
| S15 | Spherical | Infinite | 0.1100 | 1.52 | 64.2 | |
| S16 | Spherical | Infinite | 0.4000 | | | |
| S17 | Spherical | Infinite | | | | |

As can be seen from Table 19, in example 7, the object-side surface and the image-side surface of any one of the first lens E1 to the seventh lens E7 are aspheric. Table 20 shows high-order coefficients applicable to each aspheric surface in example 7, wherein the surface shape of each aspheric surface may be defined by the formula (1) given in the above example 1.

TABLE 20

| Surface number | A4 | A6 | A8 | A10 | A12 | A14 | A16 | A18 | A20 |
|---|---|---|---|---|---|---|---|---|---|
| S1 | −3.8620E−03 | 1.2485E−02 | −3.4354E−02 | 5.3163E−02 | −5.0271E−02 | 2.9293E−02 | −1.0277E−02 | 1.9923E−03 | −1.6444E−04 |
| S2 | −3.3204E−02 | 1.5701E−01 | −2.6661E−01 | 2.6186E−01 | −1.5940E−01 | 5.8974E−02 | −1.2069E−02 | 1.0058E−03 | 1.1331E−05 |
| S3 | −1.2805E−01 | 3.4091E−01 | −5.5346E−01 | 5.4138E−01 | −3.3079E−01 | 1.1971E−01 | −2.1498E−02 | 5.8476E−04 | 2.4313E−04 |
| S4 | −1.1064E−01 | 1.7561E−01 | −2.0926E−01 | 8.6432E−02 | 9.3182E−02 | −1.5982E−01 | 1.0044E−01 | −3.1194E−02 | 4.0294E−03 |
| S5 | −1.4441E−02 | 5.2202E−02 | −5.7793E−02 | 7.0695E−02 | −5.3826E−02 | 3.2182E−02 | −1.4358E−02 | 3.6207E−03 | −2.9982E−04 |
| S6 | −1.7059E−02 | 4.8793E−03 | 2.0538E−02 | −4.6205E−02 | 9.0270E−02 | −9.8233E−02 | 6.4125E−02 | −2.1896E−02 | 3.1756E−03 |
| S7 | −8.0017E−02 | 5.5015E−02 | −2.1957E−01 | 3.8760E−01 | −4.1761E−01 | 2.6785E−01 | −8.7517E−02 | 7.0389E−03 | 1.9382E−03 |
| S8 | −1.1785E−01 | 6.8780E−02 | −5.1143E−02 | −1.1054E−01 | 2.2791E−01 | −1.8564E−01 | 8.2781E−02 | −2.0441E−02 | 2.2277E−03 |
| S9 | −9.4637E−02 | −3.2561E−02 | 3.3842E−01 | −6.1116E−01 | 5.3053E−01 | −2.5566E−01 | 6.9356E−02 | −9.9151E−03 | 5.8792E−04 |
| S10 | −7.1666E−02 | −2.2600E−01 | 6.5958E−01 | −8.4728E−01 | 6.2068E−01 | −2.7420E−01 | 7.2207E−02 | −1.0437E−02 | 6.3713E−04 |
| S11 | 1.1962E−01 | −3.5082E−01 | 4.3115E−01 | −3.2735E−01 | 1.5933E−01 | −5.0006E−02 | 9.6406E−03 | −1.0181E−03 | 4.4253E−05 |
| S12 | 1.5611E−01 | −2.3700E−01 | 1.6504E−01 | −6.1685E−02 | 1.1377E−02 | −3.3469E−04 | −2.4790E−04 | 4.1438E−05 | −2.1036E−06 |
| S13 | −1.2048E−01 | −1.0318E−01 | 1.2583E−01 | −5.3238E−02 | 1.2275E−02 | −1.6854E−03 | 1.3715E−04 | −6.0681E−06 | 1.1086E−07 |
| S14 | −2.1294E−01 | 6.6166E−02 | −9.4191E−03 | −1.3946E−03 | 9.3448E−04 | −2.1069E−04 | 2.6270E−05 | −1.7460E−06 | 4.7295E−08 |

Table 21 shows effective focal lengths f1 to f7 of respective lens, a total effective focal length f of the optical imaging system, a distance TTL along the optical axis from the object-side surface S1 of the first lens E1 to the imaging plane S17, half of a diagonal length ImgH of an effective pixel area on the imaging plane S17, and half of a maximal field-of-view Semi-FOV of the optical imaging system in example 7.

TABLE 21

| f1 (mm) | 4.14 | f7 (mm) | −3.81 |
|---|---|---|---|
| f2 (mm) | −5.75 | f (mm) | 4.22 |
| f3 (mm) | 8.75 | TTL (mm) | 5.32 |
| f4 (mm) | −59.00 | ImgH (mm) | 3.50 |
| f5 (mm) | −27.08 | Semi-FOV (°) | 40.1 |
| f6 (mm) | 3.74 | | |

Figure 14A:
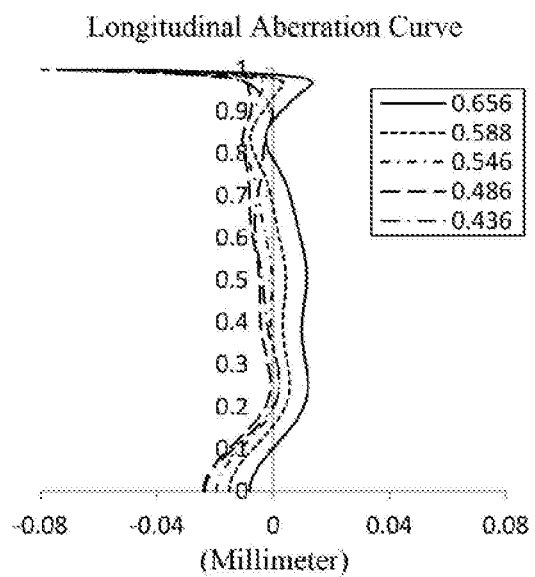
FIGS. 14A to 14D illustrate a longitudinal aberration curve, an astigmatic curve, a distortion curve, and a lateral color curve of the optical imaging system of the example 7, respectively.
Figure 14B:
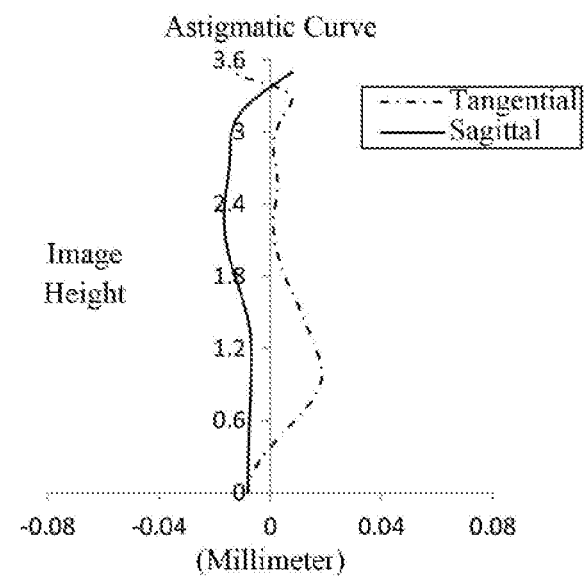
Figures 14C, 14D:
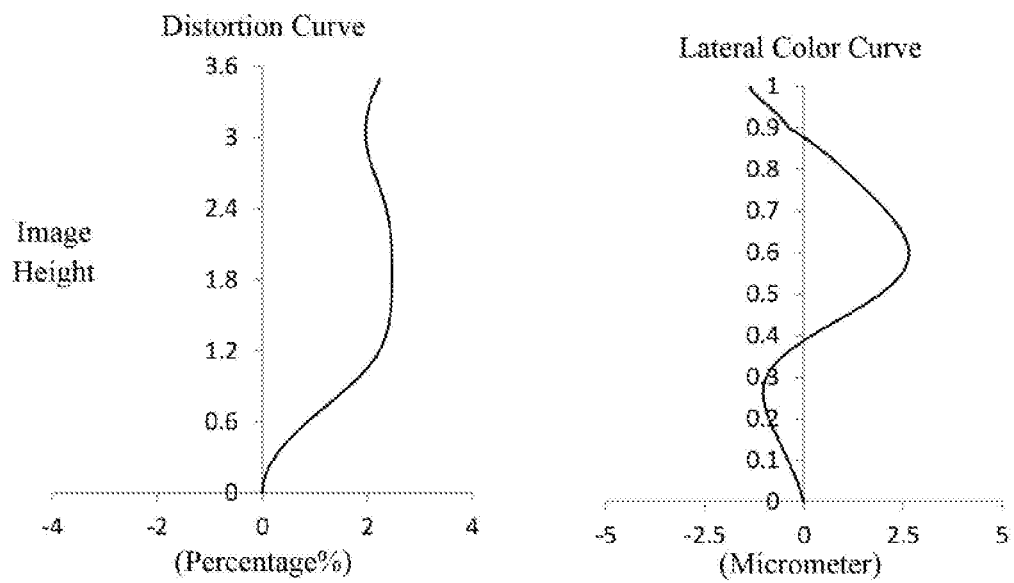

FIG. 14A illustrates a longitudinal aberration curve of the optical imaging system according to example 7, representing deviations of focal points converged by light of different wavelengths after passing through the system. FIG. 14B illustrates an astigmatic curve of the optical imaging system according to example 7, representing a curvature of a tangential plane and a curvature of a sagittal plane. FIG. 14C illustrates a distortion curve of the optical imaging system according to example 7, representing amounts of distortion corresponding to different image heights. FIG. 14D illustrates a lateral color curve of the optical imaging system according to example 7, representing deviations of different image heights on an imaging plane after light passes through the system. It can be seen from FIG. 14A to FIG. 14D that the optical imaging system provided in example 7 may achieve good image quality.

Example 8

Figure 15:
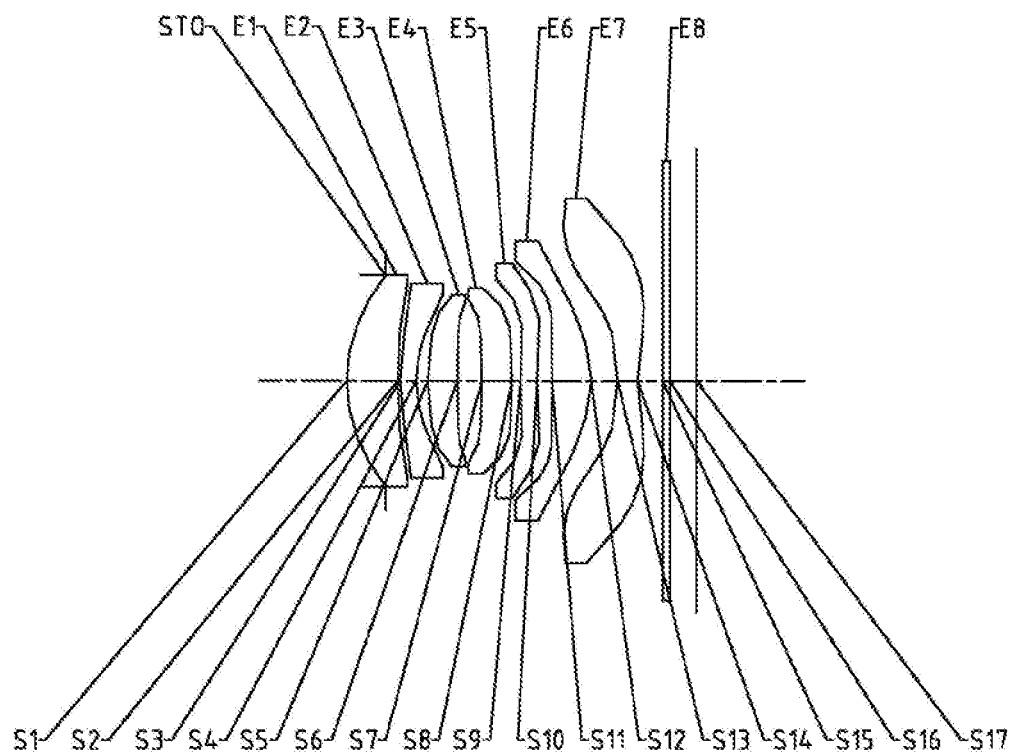
FIG. 15 illustrates a schematic structural view of an optical imaging system according to example 8 of the present disclosure.

An optical imaging system according to example 8 of the present disclosure is described below with reference to FIG. 15 to FIG. 16D. FIG. 15 shows a schematic structural view of the optical imaging system according to example 8 of the present disclosure.

As shown in FIG. 15, the optical imaging system according to an exemplary embodiment of the present disclosure includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The first lens E1 is a lens made of glass. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a concave surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 22 shows surface type, radius of curvature, thickness, material and conic coefficient of each lens of the optical imaging system in example 8, wherein the units for the radius of curvature and the thickness are millimeter (mm).

TABLE 22

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.5784 | | | |
| S1 | Aspheric | 2.3653 | 0.7612 | 1.81 | 46.6 | −0.0623 |
| S2 | Aspheric | 7.8906 | 0.0400 | | | −3.4200 |
| S3 | Aspheric | 3.6725 | 0.2400 | 1.67 | 20.4 | 0.5164 |
| S4 | Aspheric | 1.8146 | 0.1726 | | | 0.0918 |
| S5 | Aspheric | 3.8408 | 0.4432 | 1.55 | 56.1 | 1.6190 |
| S6 | Aspheric | 13.2949 | 0.3689 | | | 25.0000 |
| S7 | Aspheric | −55.2935 | 0.4495 | 1.55 | 56.1 | −90.9313 |
| S8 | Aspheric | −253.8237 | 0.1305 | | | −99.0000 |
| S9 | Aspheric | 4.0685 | 0.2500 | 1.67 | 20.4 | −90.8885 |
| S10 | Aspheric | 3.8512 | 0.2211 | | | −72.7647 |
| S11 | Aspheric | −200.0000 | 0.5900 | 1.55 | 56.1 | 25.0000 |
| S12 | Aspheric | −1.6092 | 0.3941 | | | −4.8076 |
| S13 | Aspheric | −4.0108 | 0.3000 | 1.54 | 55.8 | −29.7163 |
| S14 | Aspheric | 2.2532 | 0.3755 | | | −0.4990 |
| S15 | Spherical | Infinite | 0.1100 | 1.52 | 64.2 | |
| S16 | Spherical | Infinite | 0.4000 | | | |
| S17 | Spherical | Infinite | | | | |

As can be seen from Table 22, in example 8, the object-side surface and the image-side surface of any one of the first lens E1 to the seventh lens E7 are aspheric. Table 23 shows high-order coefficients applicable to each aspheric surface in example 8, wherein the surface shape of each aspheric surface may be defined by the formula (1) given in the above example 1.

TABLE 23

| Surface number | A4 | A6 | A8 | A10 | A12 | A14 | A16 | A18 | A20 |
|---|---|---|---|---|---|---|---|---|---|
| S1 | −4.8356E−03 | 1.5194E−02 | −4.1214E−02 | 6.3834E−02 | −6.0293E−02 | 3.5052E−02 | −1.2268E−02 | 2.3721E−03 | −1.9491E−04 |
| S2 | −3.9118E−02 | 1.9979E−01 | −3.8630E−01 | 4.5269E−01 | −3.5332E−01 | 1.8330E−01 | −6.0411E−02 | 1.1385E−02 | −9.2880E−04 |
| S3 | −1.3302E−01 | 4.1633E−01 | −7.6354E−01 | 8.7427E−01 | −6.7549E−01 | 3.4713E−01 | −1.1244E−01 | 2.0596E−02 | −1.6086E−03 |
| S4 | −1.1332E−01 | 2.2229E−01 | −3.3720E−01 | 3.1803E−01 | −1.9610E−01 | 7.5708E−02 | −1.8415E−02 | 2.2775E−03 | 6.3823E−05 |
| S5 | −2.3936E−02 | 6.8870E−02 | −8.0046E−02 | 9.5865E−02 | −6.2814E−02 | 2.3598E−02 | −3.5285E−03 | −1.1028E−03 | 5.1534E−04 |
| S6 | −7.6620E−03 | −5.7602E−02 | 2.8710E−01 | −7.3689E−01 | 1.2028E+00 | −1.2148E+00 | 7.4469E−01 | −2.5154E−01 | 3.6072E−02 |
| S7 | −2.4968E−02 | −1.0190E−01 | 2.9381E−01 | −7.4507E−01 | 1.2083E+00 | −1.2474E+00 | 7.8822E−01 | −2.7680E−01 | 4.1252E−02 |
| S8 | −1.2378E−02 | −3.4923E−01 | 9.1378E−01 | −1.4323E+00 | 1.3530E+00 | −8.0079E−01 | 2.9663E−01 | −6.3985E−02 | 6.1913E−03 |
| S9 | 1.0091E−01 | −7.7509E−01 | 1.5511E+00 | −1.7616E+00 | 1.1713E+00 | −4.5559E−01 | 1.0006E−01 | −1.1276E−02 | 5.0572E−04 |
| S10 | 1.3879E−01 | −6.9698E−01 | 1.1265E+00 | −1.0668E+00 | 6.2248E−01 | −2.2579E−01 | 4.9819E−02 | −6.1561E−03 | 3.2828E−04 |
| S11 | 1.0601E−01 | −1.9471E−01 | 4.9037E−02 | 1.2007E−01 | −1.5181E−01 | 8.4378E−02 | −2.5668E−02 | 4.1492E−03 | −2.7840E−04 |
| S12 | 4.7206E−02 | −4.5820E−02 | −2.9373E−02 | 5.3581E−02 | −2.9688E−02 | 8.7998E−03 | −1.5239E−03 | 1.4671E−04 | −6.0892E−06 |
| S13 | −1.0621E−01 | −3.4455E−02 | 4.7583E−02 | −1.5874E−02 | 2.3969E−03 | −1.2291E−04 | −1.0901E−05 | 1.7262E−06 | −6.5198E−08 |
| S14 | −2.0083E−01 | 9.6559E−02 | −4.0507E−02 | 1.2670E−02 | −2.7737E−03 | 4.0220E−04 | −3.6916E−05 | 1.9755E−06 | −4.7706E−08 |

Table 24 shows effective focal lengths f1 to f7 of respective lens, a total effective focal length f of the optical imaging system, a distance TTL along the optical axis from the object-side surface S1 of the first lens E1 to the imaging plane S17, half of a diagonal length ImgH of an effective pixel area on the imaging plane S17, and half of a maximal field-of-view Semi-FOV of the optical imaging system in example 8.

TABLE 24

| f1 (mm) | 3.84 | f7 (mm) | −2.57 |
|---|---|---|---|
| f2 (mm) | −5.36 | f (mm) | 4.16 |
| f3 (mm) | 10.02 | TTL (mm) | 5.31 |
| f4 (mm) | −35.19 | ImgH (mm) | 3.65 |
| f5 (mm) | −35.42 | Semi-FOV (°) | 40.4 |
| f6 (mm) | 2.57 | | |

Figure 16A:
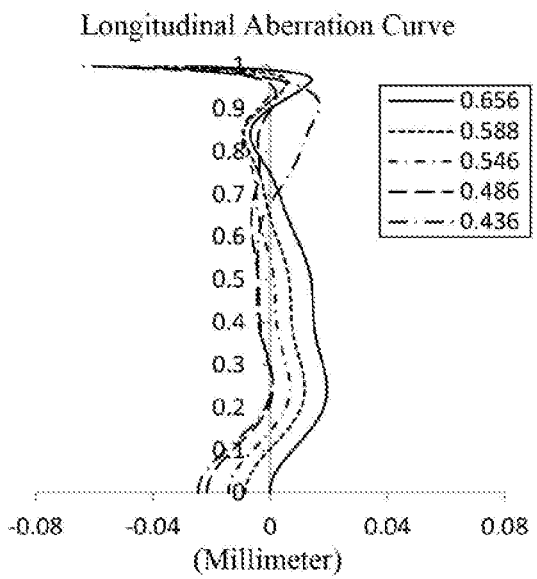
FIGS. 16A to 16D illustrate a longitudinal aberration curve, an astigmatic curve, a distortion curve, and a lateral color curve of the optical imaging system of the example 8, respectively.
Figure 16B:
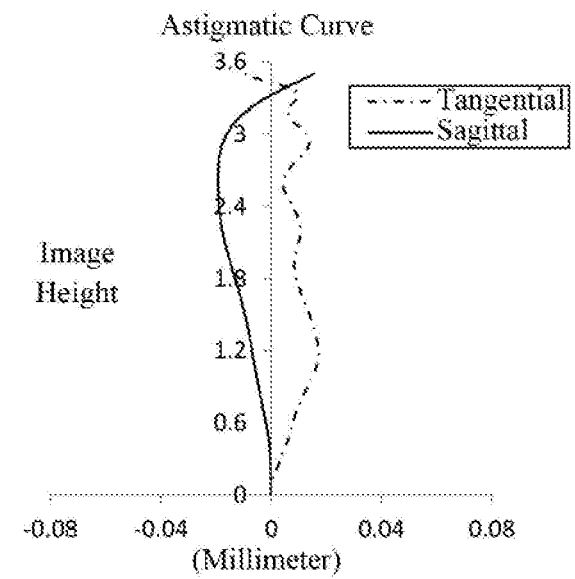
Figure 16C:
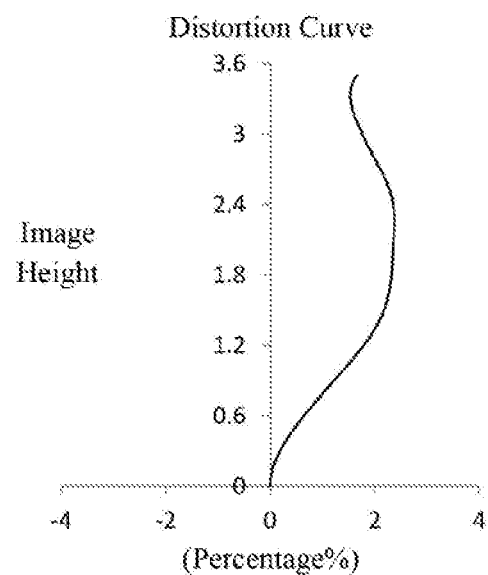
Figure 16D:
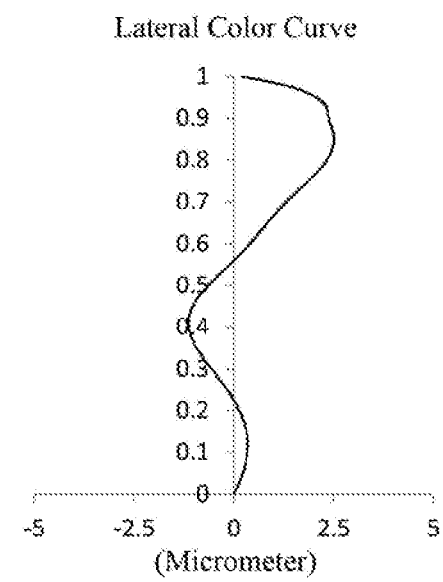

FIG. 16A illustrates a longitudinal aberration curve of the optical imaging system according to example 8, representing deviations of focal points converged by light of different wavelengths after passing through the system. FIG. 16B illustrates an astigmatic curve of the optical imaging system according to example 8, representing a curvature of a tangential plane and a curvature of a sagittal plane. FIG. 16C illustrates a distortion curve of the optical imaging system according to example 8, representing amounts of distortion corresponding to different image heights. FIG. 16D illustrates a lateral color curve of the optical imaging system according to example 8, representing deviations of different image heights on an imaging plane after light passes through the system. It can be seen from FIG. 16A to FIG. 16D that the optical imaging system provided in example 8 may achieve good image quality.

In view of the above, examples 1 to 8 respectively satisfy the relationship shown in Table 25.

TABLE 25

| Condition | Example | | | | | | | |
|---|---|---|---|---|---|---|---|---|
| | 1 | 2 | 3 | 4 | 5 | 6 | 7 | 8 |
| Fno | 1.29 | 1.32 | 1.29 | 1.29 | 1.29 | 1.29 | 1.30 | 1.29 |
| f3/f1 | 2.06 | 3.55 | 1.97 | 2.10 | 2.29 | 2.13 | 2.12 | 2.61 |
| f7/f6 | −0.92 | −0.97 | −0.94 | −0.96 | −0.93 | −0.96 | −1.02 | −1.00 |
| R3/R4 | 1.85 | 3.43 | 1.98 | 1.92 | 2.05 | 1.94 | 1.94 | 2.12 |
| R1/R5 | 0.63 | 0.51 | 0.54 | 0.63 | 0.63 | 0.58 | 0.62 | 0.63 |
| R10/R12 | −1.39 | −1.59 | −1.12 | −1.21 | −1.35 | −3.94 | −0.64 | −1.12 |
| CT6/CT2 | 2.28 | 2.71 | 2.53 | 2.34 | 2.41 | 2.72 | 2.48 | 2.56 |
| SAG31/SAG41 | −1.87 | −1.75 | −2.51 | −2.04 | −2.70 | −1.94 | −3.07 | −1.93 |
| T67/T23 | 1.65 | 1.69 | 1.78 | 2.10 | 2.08 | 1.85 | 2.00 | 2.37 |
| ET3/CT3 | 0.43 | 0.48 | 0.40 | 0.44 | 0.43 | 0.44 | 0.44 | 0.45 |
| TTL/ImgH | 1.49 | 1.47 | 1.57 | 1.47 | 1.50 | 1.48 | 1.52 | 1.46 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging system described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, comprising, sequentially from an object side to an image side along an optical axis, a first lens, a second lens, a third lens, a fourth lens, a fifth lens, a sixth lens and a seventh lens, each of which has refractive power,
   wherein,
   the first lens has positive refractive power, and the first lens is a glass lens;
   an object-side surface of the second lens is a convex surface, and an image-side surface of the second lens is a concave surface; and
   each of the fourth lens and the fifth lens has negative refractive power,
   wherein Fno<1.4, where Fno is an aperture value of the optical imaging system;
   wherein 1.5≤T67/T23<2.5,
   where T67 is a spaced interval between the sixth lens and the seventh lens along the optical axis, and T23 is a spaced interval between the second lens and the third lens along the optical axis.

2. The optical imaging system according to claim 1, wherein 1.5<f3/f1≤4,
   where f3 is an effective focal length of the third lens, and f1 is an effective focal length of the first lens.

3. The optical imaging system according to claim 2, wherein 0.5≤R1/R5<1,
   where R1 is a radius of curvature of an object-side surface of the first lens, and R5 is a radius of curvature of an object-side surface of the third lens.

4. The optical imaging system according to claim 1, wherein −1.5<f7/f6<−0.5,
   where f7 is an effective focal length of the seventh lens, and f6 is an effective focal length of the sixth lens.

5. The optical imaging system according to claim 1, wherein 1.5<R3/R4<3.5,
   where R3 is a radius of curvature of the object-side surface of the second lens, and R4 is a radius of curvature of the image-side surface of the second lens.

6. The optical imaging system according to claim 1, wherein −4.0≤R10/R12<−0.5,
   where R10 is a radius of curvature of an image-side surface of the fifth lens, and R12 is a radius of curvature of an image-side surface of the sixth lens.

7. The optical imaging system according to claim 1, wherein 2.0<CT6/CT2<3.0,
   where CT6 is a center thickness of the sixth lens along the optical axis, and CT2 is a center thickness of the second lens along the optical axis.

8. The optical imaging system according to claim 1, wherein −3.5<SAG31/SAG41<−1.5,
   where SAG31 is an on-axis distance from an intersection of an object-side surface of the third lens and the optical axis to a vertex of an effective half-aperture of the object-side surface of the third lens, and SAG41 is an on-axis distance from an intersection of an object-side surface of the fourth lens and the optical axis to a vertex of an effective half-aperture of the object-side surface of the fourth lens.

9. The optical imaging system according to claim 1, wherein 0<ET3/CT3≤0.5,
   where ET3 is an edge thickness of the third lens, and CT3 is a center thickness of the third lens along the optical axis.

10. The optical imaging system according to claim 1, wherein TTL/ImgH≤1.6,
    where TTL is an on-axis distance from an object-side surface of the first lens to an imaging plane of the optical imaging system, and ImgH is half of a diagonal length of an effective pixel area on the imaging plane of the optical imaging system.

11. An optical imaging system, comprising, sequentially from an object side to an image side along an optical axis, a first lens, a second lens, a third lens, a fourth lens, a fifth lens, a sixth lens and a seventh lens, each of which has refractive power, wherein, the first lens has positive refractive power, and the first lens is a glass lens;

an object-side surface of the second lens is a convex surface, and an image-side surface of the second lens is a concave surface; and each of the fourth lens and the fifth lens has negative refractive power, wherein Fno<1.4, where Fno is an aperture value of the optical imaging system, and wherein 1.5<R3/R4<3.5, where R3 is a radius of curvature of the object-side surface of the second lens, and R4 is a radius of curvature of the image-side surface of the second lens.

12. The optical imaging system according to claim 11, wherein $1.5 < f3/f1 \leq 4$, where f3 is an effective focal length of the third lens, and f1 is an effective focal length of the first lens.

13. The optical imaging system according to claim 11, wherein −1.5<f7/f6<−0.5, where f7 is an effective focal length of the seventh lens, and f6 is an effective focal length of the sixth lens.

14. The optical imaging system according to claim 11, wherein $-4.0 \leq R10/R12 < -0.5$, where R10 is a radius of curvature of an image-side surface of the fifth lens, and R12 is a radius of curvature of an image-side surface of the sixth lens.

15. The optical imaging system according to claim 11, wherein 2.0<CT6/CT2<3.0, where CT6 is a center thickness of the sixth lens along the optical axis, and CT2 is a center thickness of the second lens along the optical axis.

16. The optical imaging system according to claim 11, wherein −3.5<SAG31/SAG41<−1.5, where SAG31 is an on-axis distance from an intersection of an object-side surface of the third lens and the optical axis to a vertex of an effective half-aperture of the object-side surface of the third lens, and SAG41 is an on-axis distance from an intersection of an object-side surface of the fourth lens and the optical axis to a vertex of an effective half-aperture of the object-side surface of the fourth lens.

17. The optical imaging system according to claim 11, wherein $1.5 \leq T67/T23 < 2.5$, where T67 is a spaced interval between the sixth lens and the seventh lens along the optical axis, and T23 is a spaced interval between the second lens and the third lens along the optical axis.

18. An optical imaging system, comprising, sequentially from an object side to an image side along an optical axis, a first lens, a second lens, a third lens, a fourth lens, a fifth lens, a sixth lens and a seventh lens, each of which has refractive power, wherein, the first lens has positive refractive power, and the first lens is a glass lens;

an object-side surface of the second lens is a convex surface, and an image-side surface of the second lens is a concave surface; and each of the fourth lens and the fifth lens has negative refractive power, wherein Fno<1.4, where Fno is an aperture value of the optical imaging system;

wherein $0 < ET3/CT3 \leq 0.5$, where ET3 is an edge thickness of the third lens, and CT3 is a center thickness of the third lens along the optical axis.

\* \* \* \* \*